United States Patent [19]

Hessler et al.

[11] Patent Number: 4,721,277
[45] Date of Patent: Jan. 26, 1988

[54] LEVER ASSEMBLY FOR MANUAL SIX-WAY SEAT ADJUSTMENT

[75] Inventors: Alfred Hessler; Andrzej Bartczak, both of Markham, Canada

[73] Assignee: Magna International Inc., Markham, Canada

[21] Appl. No.: 825,973

[22] Filed: Feb. 4, 1986

[51] Int. Cl.$^4$ .............................................. B60N 1/02
[52] U.S. Cl. .................................... 248/393; 248/394; 248/396; 248/429
[58] Field of Search ................ 248/393, 394, 396, 429

[56] References Cited

U.S. PATENT DOCUMENTS

| | | | |
|---|---|---|---|
| 2,298,351 | 10/1942 | DeRose | 248/394 |
| 2,930,428 | 3/1960 | DeRose | 248/394 |
| 3,527,438 | 9/1970 | White | 248/396 |
| 3,692,271 | 9/1972 | Homier et al. | 248/394 |
| 4,325,527 | 4/1982 | Berneking | 248/394 |
| 4,482,120 | 11/1984 | Fudala | 248/394 |

FOREIGN PATENT DOCUMENTS 2278526  2/1976  France ............................ 248/394

Primary Examiner—Alexander Grosz
Assistant Examiner—Eric K. Nicholson
Attorney, Agent, or Firm—Ivor M. Hughes

[57] ABSTRACT

This invention relates to adjustable seats and components therefor including mechanisms for assisting in their adjustability and a hand-operated lever employed for both adjusting the inclination and height of the front or rear portion of the seat cushion above the base of the seat and positioning and moving the seat longitudinally to provide a six-way adjustment while permitting only one adjustment to be made at one time.

2 Claims, 28 Drawing Figures

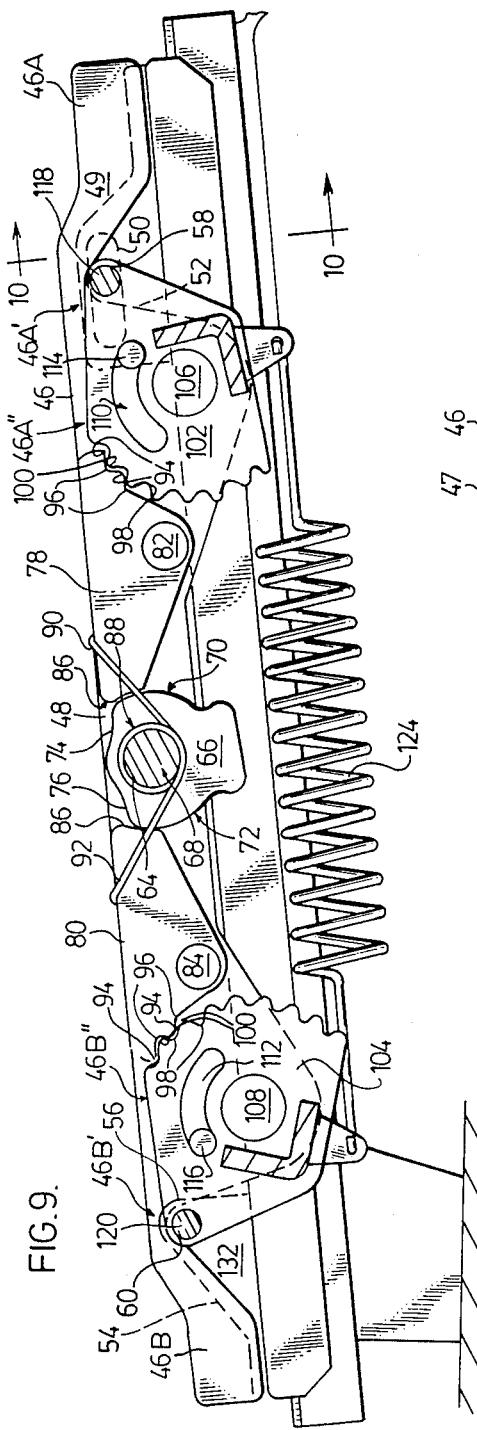
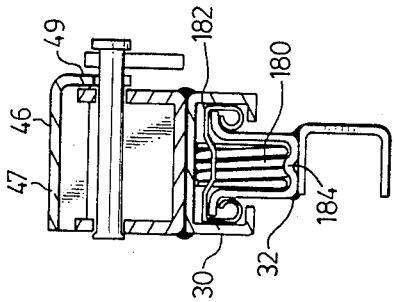
FIG.9.
FIG.10.

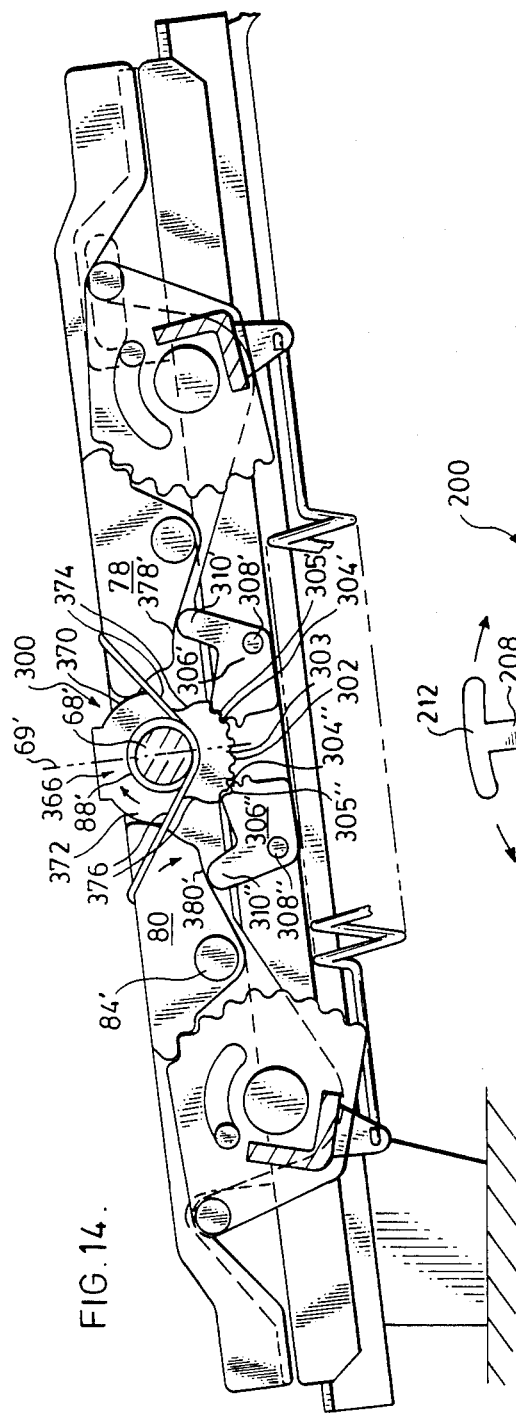
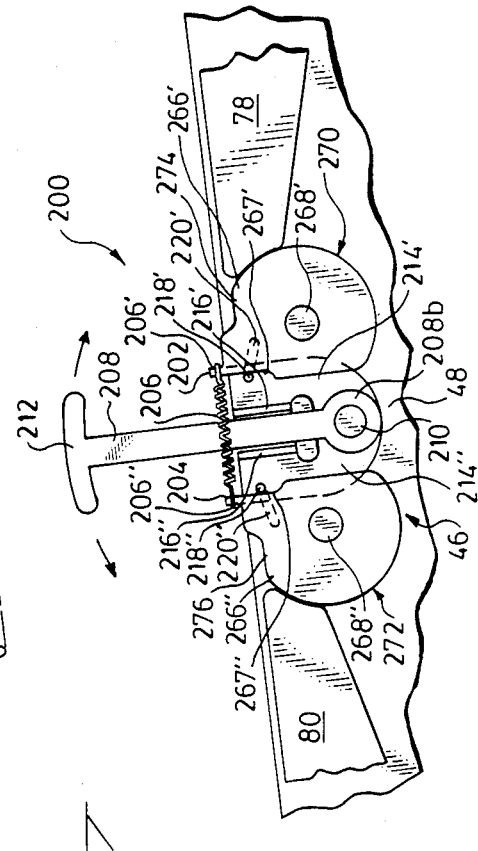
FIG. 14.
FIG. 13.

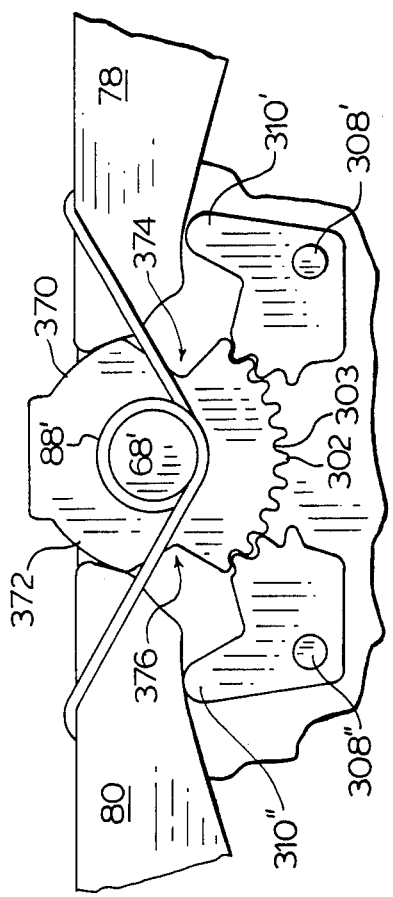
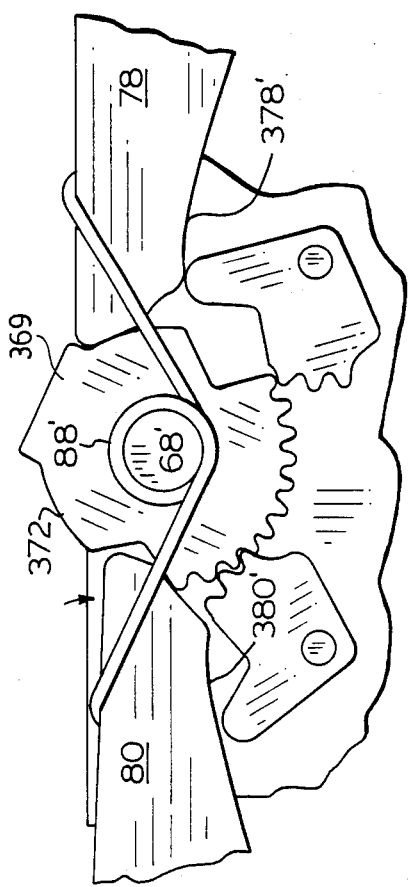
FIG. 15.
FIG. 16.

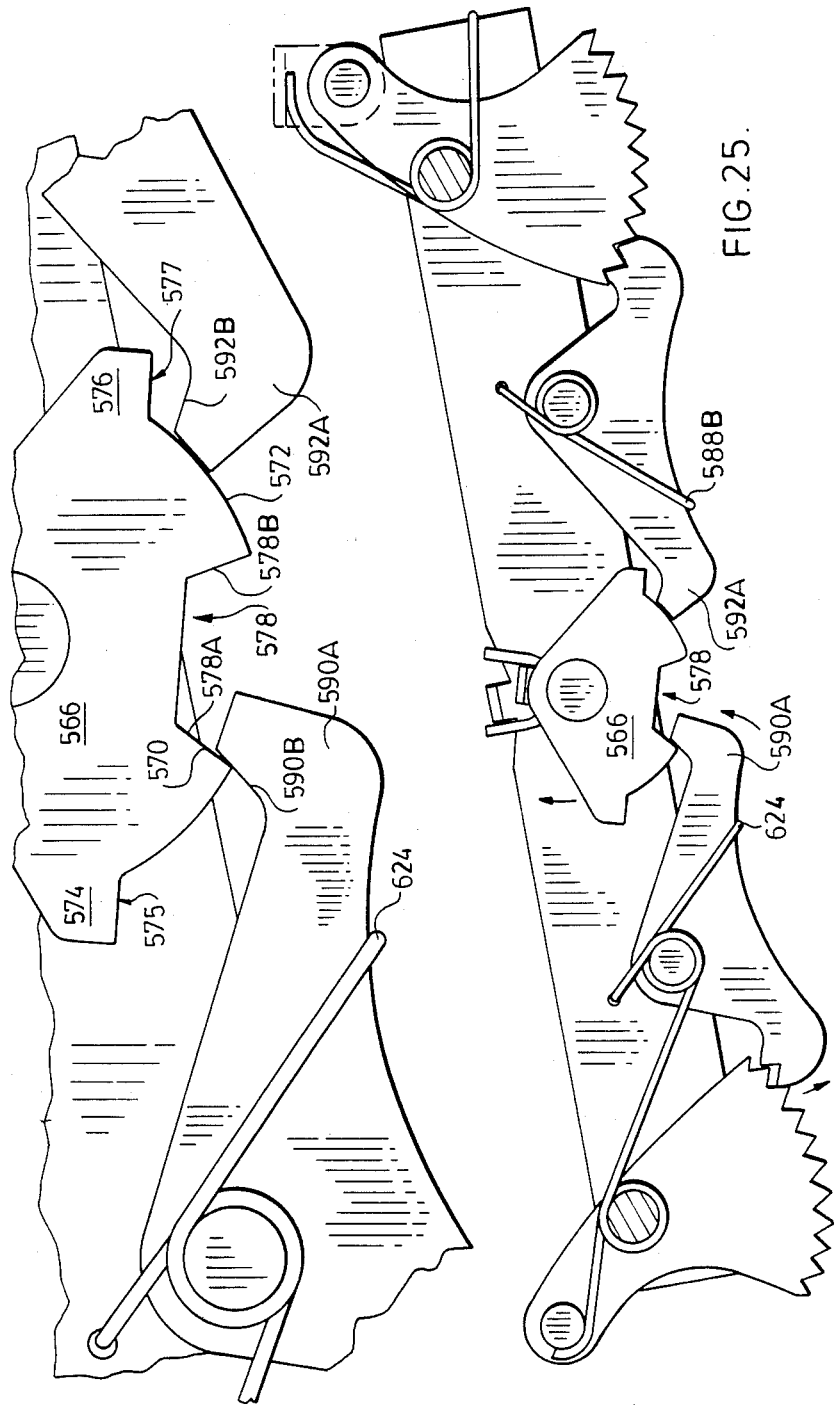

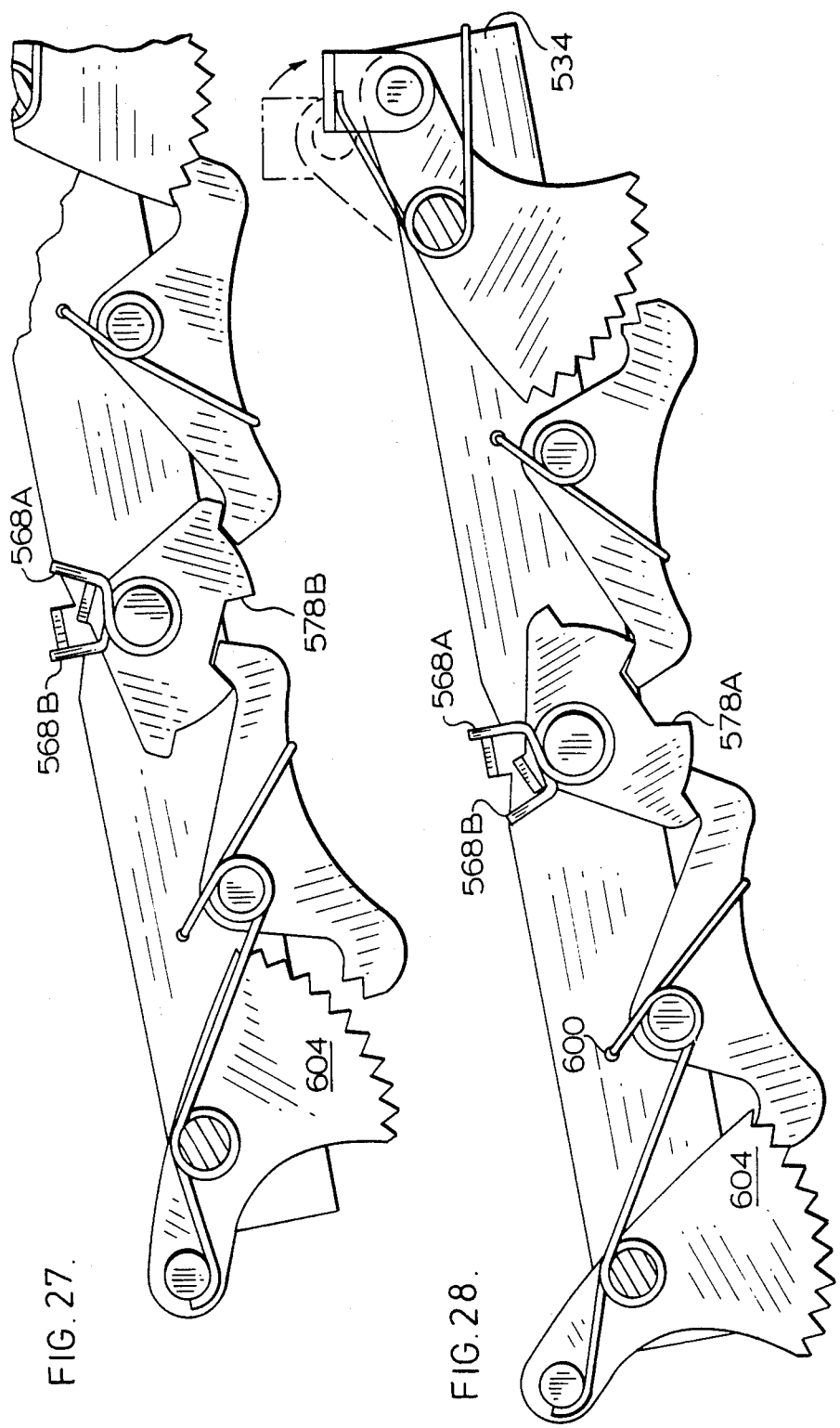

LEVER ASSEMBLY FOR MANUAL SIX-WAY SEAT ADJUSTMENT

FIELD OF INVENTION

This invention relates to adjustable seats and components therefor including, mechanisms for assisting in their adjustability and, a hand-operated lever employed for both adjusting the inclination and height of the seat cushion above the base of the seat and positioning and moving the seat longitudinally. This invention is also related to our co-pending U.S. application Ser. No. 826,668 for a seat adjustment mechanism.

BACKGROUND OF THE INVENTION

Seats including mechanisms for providing adjustment of the inclination of the seat cushion and the vertical position of the seat cushion above the base of the seat are known in the art. In this regard see U.S. Pat. Nos. 2,609,029; 2,792,873; 2,795,267; 2,942,647; 3,147,945; 3,165,351; 3,552,707; 3,662,984; 3,692,271; 4,190,225; 4,222,543; and 4,247,071.

Some of these patents also teach hand-operated levers and associated mechanisms and components employed for positioning and moving the seat longitudinally. See U.S. Pat. Nos. 2,792,873; 2,795,267; 3,147,945; and 3,662,984. See also U.S. Pat. No. 3,659,895 which teaches an actuating handle and associated mechanism and components which are used to actuate rotational movement of a seat assembly about a vertical axis and longitudinal movement of the seat both forward and backwards with respect to the vehicle.

However, each proposal taught suffers some disadvantage, for example, sloppiness, noise during operation, cost of manufacture and complexity of assembly and operation. By way of example, the structure taught by U.S. Pat. No. 4,190,255 is noisy to operate, sloppy and expensive to manufacture, being more suitable for use in heavy-duty off-road equipment where there is not concern for "seat chucking", sloppiness and noise of operation.

It is therefore an object of this invention to provide an improved seat assembly and mechanisms therefor for use to adjust the position of the seat cushion of a seat providing improved adjustability of the inclination of the seat cushion, and the vertical position of the seat cushion above the seat base of the seat. In this regard, the seat is more easily adjusted without noise, sloppiness and complexity of assembly and operation, whether the rear of the seat cushion is positioned higher or lower than the front of the seat cushion or the vertical height of the seat is raised or lowered.

It is a further object of this invention to provide an improved hand-operated lever and associated mechanism and components therefor which are used to actuate longitudinal movement of the seat and to adjust the inclination of the seat cushion (to position the rear of the seat cushion higher or lower than the front of the seat cushion) and the vertical position of the seat cushion above the base.

Further and other objects of the invention will be realized by those skilled in the art from the following summary of the invention and detailed description of an embodiment thereof.

SUMMARY OF THE INVENTION

According to one aspect of the invention, a seat adjustment assembly is provided for adjusting the inclination and vertical position of a seat cushion of a seat above the base of the seat, the seat assembly comprising:

(a) a base, (b) a seat cushion supported in spaced relation above the base, (c) a support for carrying the cushion in spaced relation above the base and being secured thereto, the support carrying (i) a cam assembly disposed proximate the center thereof and carrying opposed peripheral circular (convex) portions and another portion adjacent each circular portion facing each other and being closer to one another than the circular portions are close to one another (for example, recesses, indented portions, indentations)

(ii) means to permit the rotation of at least one circular cam portion at a time (iii) a pair of pawls on either side of the cam assembly, each pawl being secured for pivotal movement and having its end closest the cam assembly carrying a recess corresponding in shape to the circular cam portion for normally being engaged therewith whereby displacement of at least one of the circular portions of the cam assembly (as for example, by pivoting of the one part of the cam assembly carrying the circular portion to be displaced or rotation of the cam assembly or a portion thereof) releases the associated pawl permitting the seat to be adjusted and means are provided to the seat to be adjusted and means are provided to return the cam assembly and pawls to their normal position.

The pawls may in turn be pivotably removably secured at their other ends to ratchets, one of which is released when one of the pawls is released whereby permitting adjustment of the height or inclination of the seat.

Therefore displacement of one of the circular portions of the cam permits adjustment of the height of one portion of the seat. At the same time at least one portion of the other circular portion remains in the circular recess of the other pawl holding it in its normal position.

According to another aspect of the invention, a seat adjustment assembly is provided for adjusting the inclination and vertical position of a seat cushion of seat above the base of a seat, the seat assembly comprising (a) a base (b) a seat cushion supported in spaced relation above the base (c) a support for carrying the cushion in spaced relation above the base and being secured thereto, the support carrying (i) a cam assembly disposed proximate the center thereof and having a vertical axis of symmetry, the cam assembly carrying opposed peripheral circular (convex) portions on either side of the axis of the symmetry and other portions on either side of the axis of symmetry (for example, recesses, indentations, indented portions) and closer to one another than the circular (convex) portions, (ii) means to permit the rotation of at least one circular cam portion at a time (iii) a pair of pawls on either side of the cam assembly, each pawl being secured for pivotal movement and having its end closest the cam assembly carrying a recess corresponding in shape to the circular cam portion for normally being engaged therewith whereby displacement of at least one of the circular portions of the cam assembly (as for example by pivoting of one part of the cam assembly carrying the circular portion to be displaced or rotation of the cam assembly or a portion thereof) releases the associated pawl permitting the seat to be adjusted and means are provided to return the cam assembly and pawls to their normal position.

The pawls may be in turn pivotable removably secured at their other ends to ratchets, one of which is released when one of the pawls is released thereby permitting adjustment of the height and inclination of the seat.

According to another aspect of the invention, a seat adjustment assembly is provided for adjusting the inclination and vertical position of a seat cushion of a seat, the seat assembly comprising a pair of pawls normally releasably fixed against pivoting by their engagement with an assembly between them and which pawls when released one at a time, permit adjustment of the inclination and vertical position of the seat cushion, the assembly between the pawls comprising a cam assembly carrying opposed peripheral circular (convex) portions and another portion adjacent each circular portion facing each other and being closer to one another than the circular portions are close to one another (for example recesses, indented portions, indentations) and the ends of the pawls engaging the assembly carry a recess corresponding in shape to the circular cam portion for which they are engaged and whereby means are provided for displacing the cam assembly and thus the pawls to permit adjustment and means are provided for returning the cam assembly and pawls to their normal position. Preferably the cam assembly carries a vertical axis of symmetry therethrough with one of the circular cam portions and one of the other portions of the cam on either side of the axis of symmetry.

According to another aspect of the invention a seat adjustment assembly is provided for adjusting the inclination and vertical position of a seat cushion of a seat above the base of the seat, the seat assembly comprising:

(a) a base (b) a seat cushion supported in spaced relation above the base, (c) a support for carrying the cushion in spaced relation above the base and being secured thereto, the support carrying (i) a cam assembly proximate the center thereof and carrying opposed peripheral circular portions and another portion adjacent each circular portion facing one another and being closer to one another than the circular portions are close to one another, (ii) means to cause the rotation of at least one circular cam portion at a time (iii) means to limit the rotation of the at least one circular cam position (iv) a pair of pawls, one on either side of the cam assembly pivotally secured intermediate their ends to the support to pivot with respect to the support, each pawl carrying a recess on the end thereof closest the cam assembly in the form of a cam follower corresponding in shape to the circular cam portion to which it is adjacent for engaging such circular portion of the cam assembly, the other end of each pawl carrying at least one fastener (securing) element for removably securing each pawl to a component (in one embodiment, a ratchet) for permitting raising and/or lowering the front and/or rear of the seat cushion, (v) means to cause each pawl to pivot when the pawl recess engages the other proximate the circular cam portion to permit adjustment of the seat cushion and means to ensure restoration of the securing of the component and pawl after adjustment of the seat cushion.

In one embodiment, each fastener element of each pawl may be removably securable to a complementary fastener element of a ratchet for permitting raising and/or lowering the front and/or rear of the seat cushion.

According to another aspect of the invention the other portion adjacent each circular portion may be above the circular portion.

According to another aspect of the invention, the other portion adjacent each circular portion may be below the circular portion. Where each other portion is above each circular portion, the means to cause each pawl to pivot when the pawl recess engages the other portion proximate the circular cam portion comprises spring means for urging the end of each pawl proximate the cam downwardly when the pawl engaged the other portion above the cam and the means to ensure restoration of the securing of the component and pawl after adjustment of the seat cushion preferably comprises the same spring means. Preferably the spring means is secured to a rotatable lever which is secured to the cam for rotating the cam. When the lever was released, the spring means returns the lever to its original position.

According to one aspect of the invention, a seat adjustment assembly is provided for adjusting the inclination and vertical position of a seat cushion of a seat above the base of the seat, the seat assembly comprising;

(a) a base, (b) a seat cushion supported in spaced relation above the base, (c) pair of elongated members for carrying the cushion in spaced relation above the base and being secured thereto, each elongated member being carried proximate one side edge of the seat cushion on the underside thereof, and carrying:

(i) a cam proximate the center thereof rotatable about an axis extending perpendicular to the plane of the cam, the axis being carried in a rod joining each cam and being rotatable with respect to each elongated member, each cam carrying diametrically opposed peripheral circular portions on either side of the axis and another portion above each circular portion closer through its entire length to the axis than the circular portion;

(ii) means to rotate the rod (for example a lever);

(iii) a pair of pawls, one on either side of the cam pivotally secured intermediate their ends to the elongated member to pivot with respect to the cam, each pawl carrying a recess on the end thereof closest the cam in the form of a cam follower corresponding in shape to the circular portion of the cam for engaging the circular portion of the cam, the other end of each pawl carrying at least one fastener element;

(iv) a ratchet being pivotally secured to the elongated member and carrying a complementary fastener element for removably securing the pawl to the ratchet, (preferably the fastener and complementary fastener elements being a tooth and receiving notches);

(v) means to cause each pawl proximate the cam to pivot downwardly when the pawl recess engages the other cam surface portion above the circular cam surface portion (preferably in the form of a torsion spring); and (vi) means to urge the end of the ratchet bearing the complementary fastener element to rotate about the pivot point of the ratchet with respect to the elongate member (preferably in the form of a spring) whereby when the recess of the pawls carrying the cam follower surface engages the upper portion of the cam closer the axis, the fastener element is disengaged from the complementary element on the ratchet, permitting the ratchet to pivot.

(d) each ratchet also being pivotably secured to the base and carrying an arcuate slot spaced from the pivot of each ratchet to the elongated member and each elongated member carrying a pin for riding in each arcuate slot whereby when the ratchet is permitted to pivot when respect to the elongated member, it also pivots with respect to the base thus causing the pin carried in each slot to move in the slot for accommodating the adjustment of the seat and whereby only one of the pawls on each elonagated member is permitted to rotate upwardly at any one time for adjustment of the front or rear of the seat cushion at any one time.

According to another aspect of the invention, the axis of the cam and thus the cam are rotated by rotation of a lever either counterclockwise or clockwise in a vertical plane or zone. Preferably the rotation of the lever upwardly permits adjustment of the front of the seat cushion and the lowering of the lever permits adjustment of the rear of the seat cushion.

Preferably the ratchets opposite one another on the elongated members are secured to one another as for example by a bar. Preferably the means to urge the end of the ratchet bearing the complementary fastener elements to rotate comprises a compression spring secured at each end to each of the ratchets secured to the same elongate member so that when each of the ratchets is released one at a time, it is permitted to rotate about the pivot points with respect to the elongate member and base upwardly forcing the seat cushion upwardly. For lowering the seat cushion greater weight may be applied to the portion of the seat cushion above the ratchet which has been permitted to pivot upwardly forcing it downwardly and thus the seat portion which is then locked in position when the cam is returned to its initial position.

Where each other portion is below each circular portion, the means to cause each pawl to pivot when the pawl recess engages the other portion proximate the circular cam portion comprises spring means for urging the ends of each pawl proximate the cam downwardly as such end engaged the other portion and the means to ensure restoration of the securing of the component and pawl of the seat cushion comprise a pair of L-shaped members each member pivotal with respect to the bottom of the cam at one end for engaging teeth carried by the bottom of the cam and at other end for engaging the underside of the pawl, each arm of the L-shaped members being of substantially the same length and the member being pivotally secured at the junction to the two arms to the support whereby when the cam is rotated and one of the pawls pivoted downwardly, the arm of the member secured to the cam is pivoted to lower the arm below the pawl thereby permitting the pawl to move downwardly and whereby after the seat cushion had been adjusted and the spring means released restoring the cam, the member is pivoted to its original position with the arm of the L-shaped member below the pawl, pushes the pawl upwardly restoring it and the spring means to its original position.

According to another aspect of the invention, the cam assembly comprises two individual components with the circular portions being on separate parts independently movable from the other. In one embodiment each part is operated by a lever by pushing the separate part when rotated in one direction and which separate parts are secured together by spacing means so when one of the separate parts is rotated and released the separate part is urged by the spring to rotate towards its original position.

According to another aspect of the invention, a lever assembly is provided for manual six-way seat adjustment of the position of a seat having a seat cushion carried on a track secured to a seat base which permits only one adjustment to be made at one time, either seat cushion inclination or longitudinal positioning of the seat along a track from one position to another, a track secured to a base, which permits only one adjustment to be made at one time (either seat cushion inclination or longitudinal positioning of the seat along a track from one position to another)

(a) forwards and backwards along a track from one position to another position;

(b) raising or lowering the front of the seat relative to the rear of the seat;

—and (c) raising or lowering the rear of the seat relative to the front of the seat, the lever assembly comprising a lever, the lever being pivotally secured in a holder carried by the seat base to pivot towards the seat to thereby cause the removal of removably securable securing means normally carried by the base securing the base of the seat to the track to be removed releasing the base of the seat permitting slidable movement of the base of the seat on the track and permitting the base of the seat to be secured at said another position along the track when the lever is released urging the securing means to secure the base wof the seat to the track, the lever also being rotatable in a vertical direction without releasing the base of the seat for movement on the track either clockwise or counterclockwise to permit activation of a system for permitting vertical adjustment of the seat cushion, the lever assembly operating with a seat adjustment assembly for adjusting the inclination and vertical position of a seat cushion of a seat, the seat adjustment assembly comprising a pair of pawls normally releasably fixed against pivoting by their engagement with an assembly disposed between them and which pawls when released one at a time, permit adjustment of the inclination and vertical position of the seat cushion, the assembly between the pawls comprising a cam assembly carrying opposed peripheral circular portions and another portion adjacent each circular portion facing each other and being closer to one another than the circular portions are close to one another and the ends of the pawls engaging the assembly, and each pawl carrying a recess corresponding in shape to the circular cam portion to which they are engaged and whereby means are provided for displacing the cam assembly and thus the pawls to permit adjustment and means for returning the cam assembly and pawls to their normal position. Preferably only one adjustment may be made at one time (either seat cushion inclination or longitudinal position). In one embodiment the lever assembly operates with the adjustable seat assembly for adjusting the inclination and position of a seat cushion above the base of the seat as previously described.

The invention will now be illustrated with reference to the following drawings and detailed description of the structural embodiments disclosed in the drawings.

BRIEF DESCRIPTION OF THE DRAWINGS

FIG. 9 is a schematic side view of the assembly shown in FIGS. 4 and 5.

FIG. 10 is a cross-sectional view taken along the line 10—10 of FIG. 9 looking in the direction of the arrows.

FIG. 13 is a side view of part of another seat adjustment assembly which may be used for adjusting a seat.

FIG. 14 is a side view of still yet another seat adjustment assembly capable of use to adjust the automobile seat shown in FIGS. 1, 2 and 3.

FIGS. 15 and 16 are close-up views of part of the assembly shown in FIG. 14 in various relative operational positions.

FIG. 25 illustrates the operation of part of the seat adjustment assembly of FIGS. 20 to 24 inclusive.

FIG. 26 is a close-up view of part of the structure shown in FIG. 25.

FIGS. 27 and 28 illustrate the operation of the assembly shown in FIG. 25.

DETAILED DESCRIPTION OF THE DRAWINGS

Figure 1:
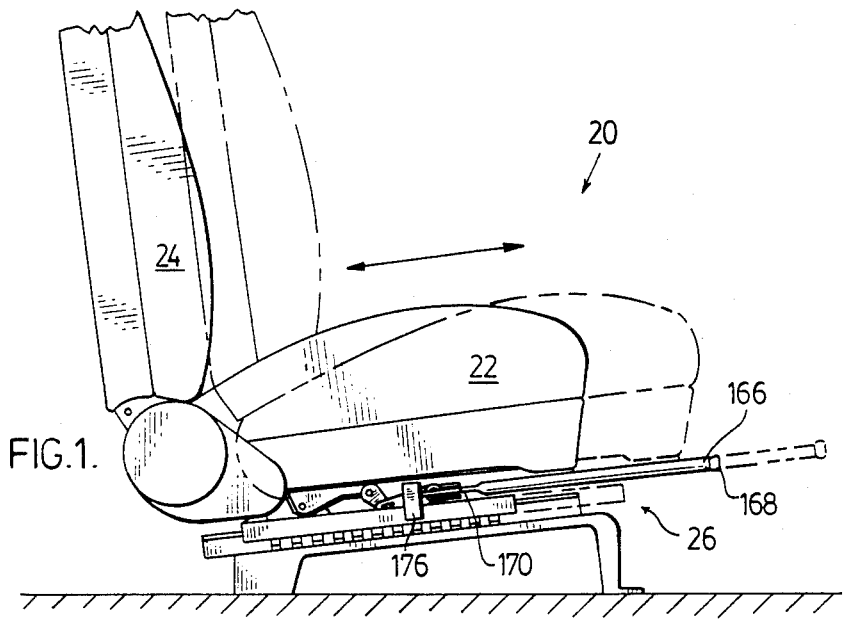
FIGS. 1, 2 and 3 are side views of an automobile seat constructed according to an embodiment of the invention illustrating the longitudinal adjustability of the seat (FIG. 1), the upward vertical adjustment of the front of the seat with respect to the rear of the seat (FIG. 2) and the upward vertical adjustment of the rear of the seat with respect to the front of the seat (FIG. 3).
Figure 2:
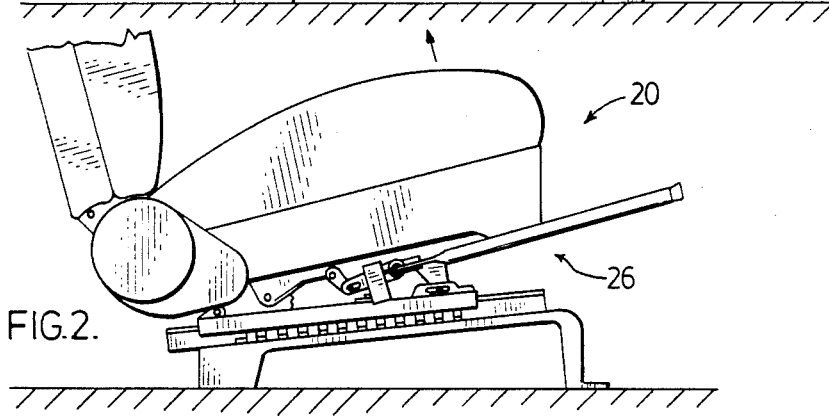
Figure 3:
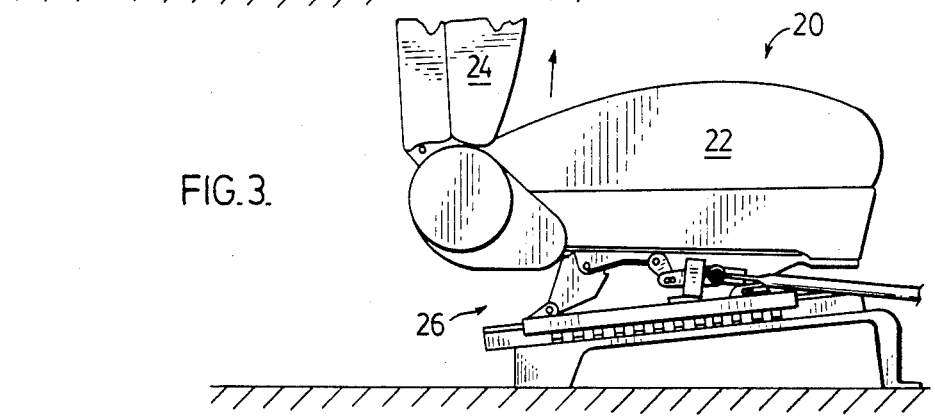
Figure 4:
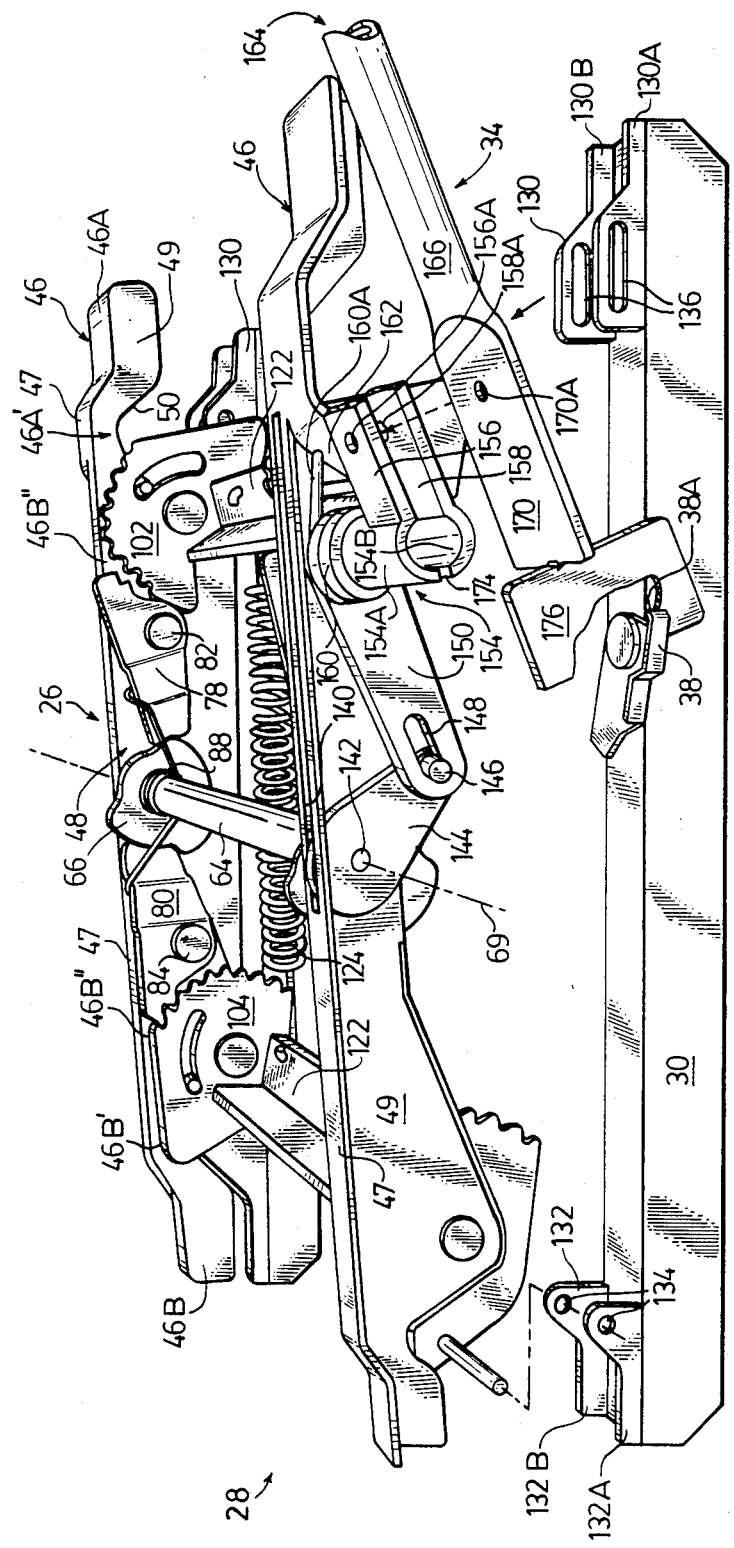
FIG. 4 is a perspective view of the seat adjustment assembly used to adjust the automobile seat shown in FIGS. 1, 2 and 3.
Figure 5:
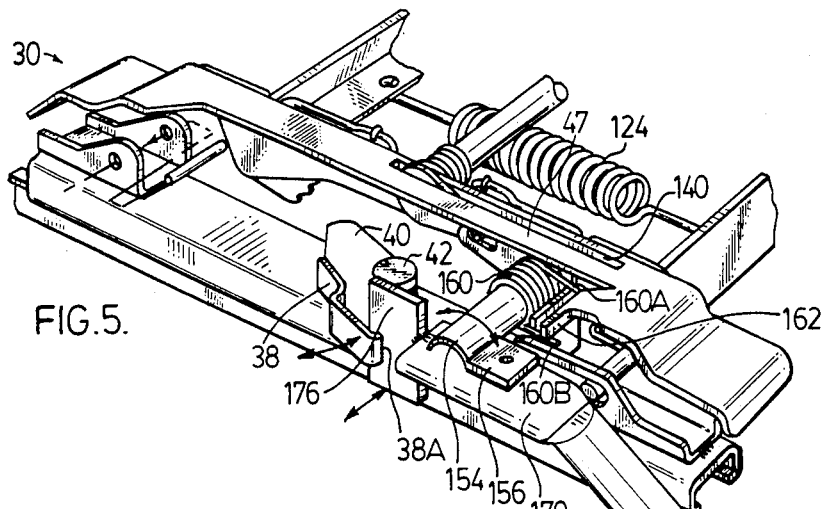
FIG. 5 is a close-up perspective view of part of the assembly shown in FIG. 4.
Figure 6:
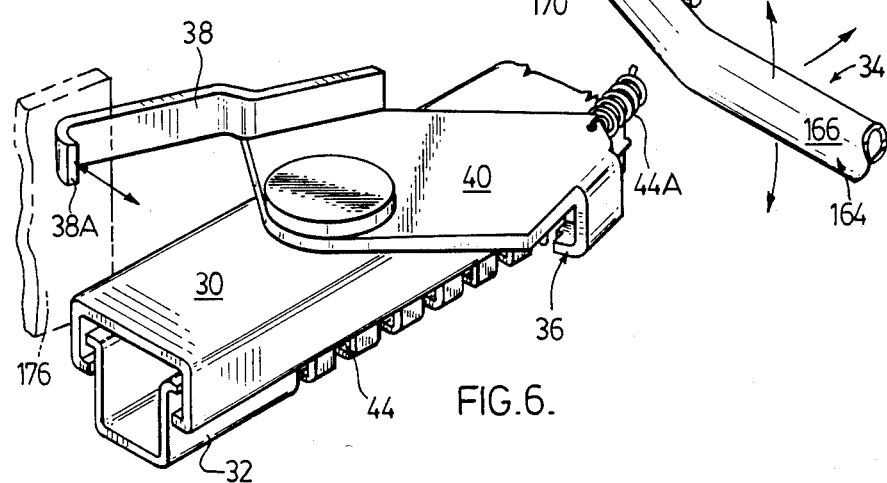
FIG. 6 is a perspective view of part of the structure shown in FIGS. 4 and 5.
Figure 7:
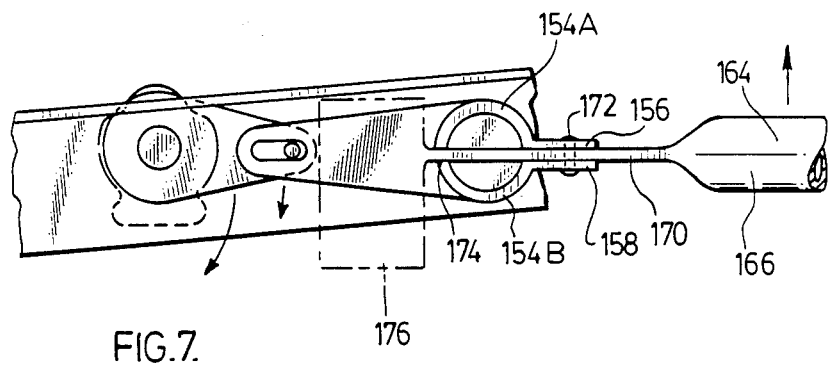
FIG. 7 is a schematic side view of part of the assembly shown in FIGS. 4 and 5.

With reference to FIGS. 1, 2 and 3, there is shown seat 20 having seat cushion 22 and seat back 24 pivotally secured to pivot with respect to seat cushion 22. Seat cushion 22 is secured to seat adjustment assembly 26. With reference to FIG. 4, seat adjustment assembly 26 is carried on two frame assemblies 28, one on either side of seat cushion 22. One assembly 28, labelled as 30 is removably secured to one of the spaced stationary tracks 32 (see FIG. 6) closest lever 34 (see FIGS. 4 and 5) for sliding movement therealong when released by the removal of tooth 36 (see FIG. 6) caused by the pivoting of arm 38 of latch 40 pivotally secured to base 30 by pin 42 against the action of spring 44 which normally urges tooth 36 of latch 40 into a notch 44 of track 32.

Figure 8:
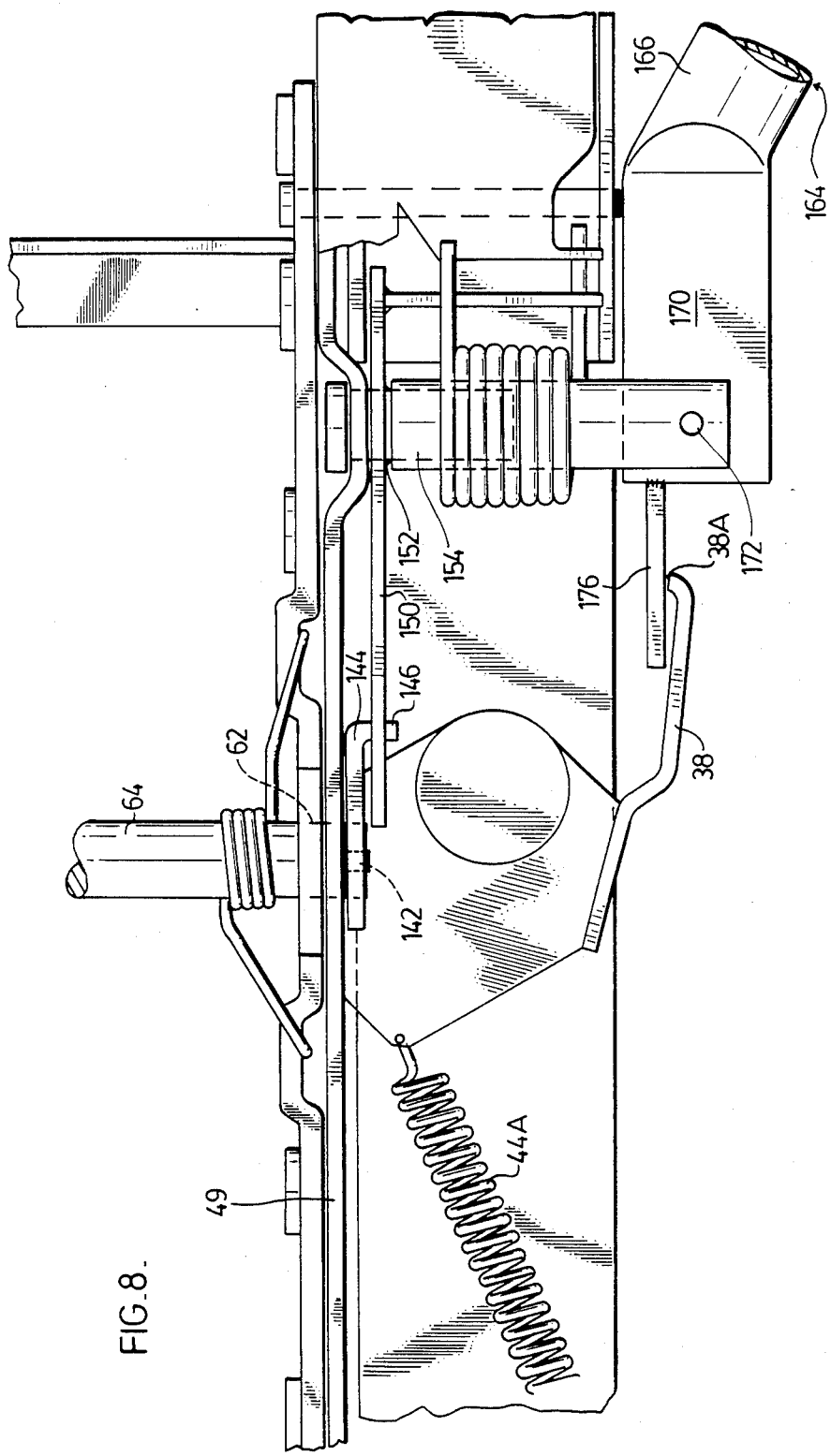
FIG. 8 is a top view of part of the structure shown in FIGS. 4 and 5.
Figure 11:
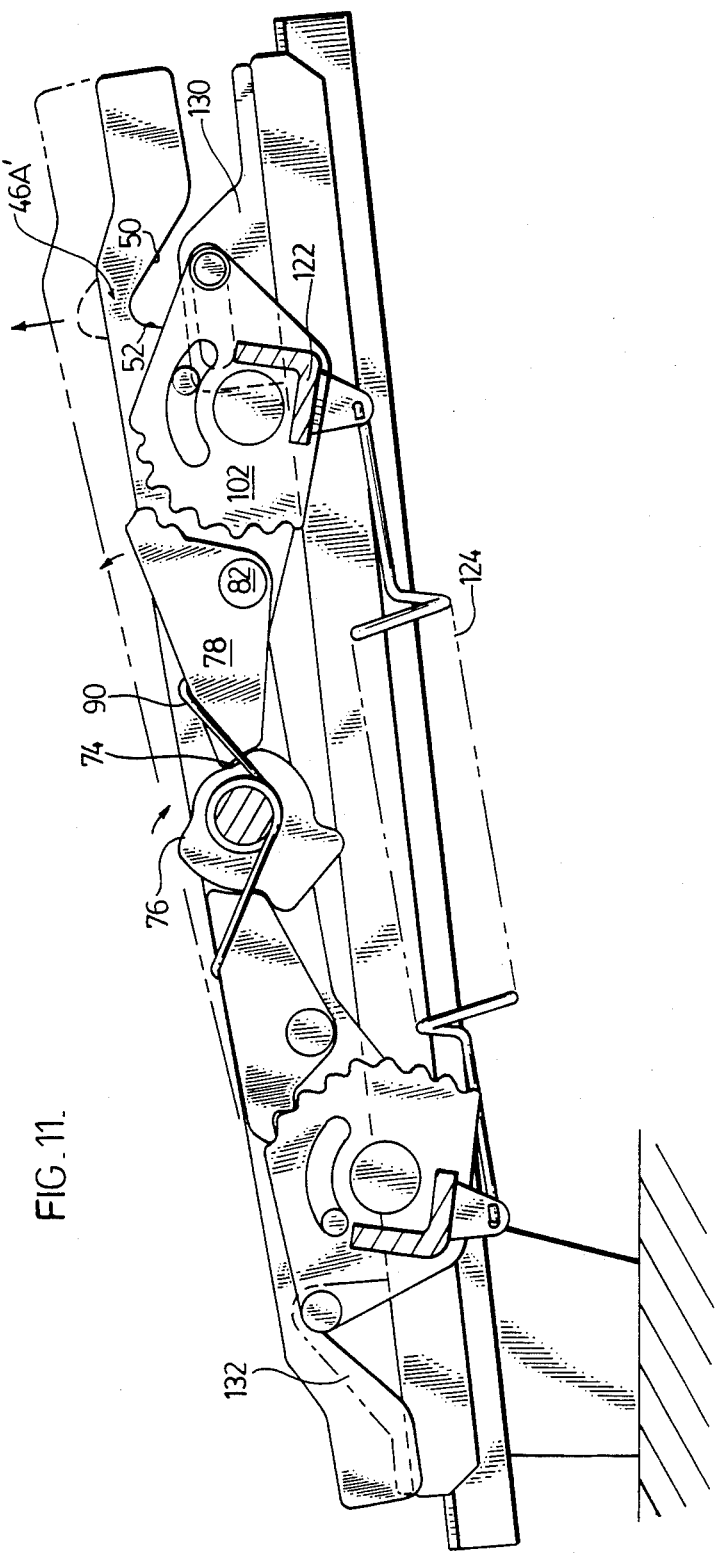
FIGS. 11 and 12 illustrate the operation of part of the assembly shown in FIGS. 4, 5 and 10 for the adjustment of the front and rear of the seat cushion of the seat.
Figure 12:
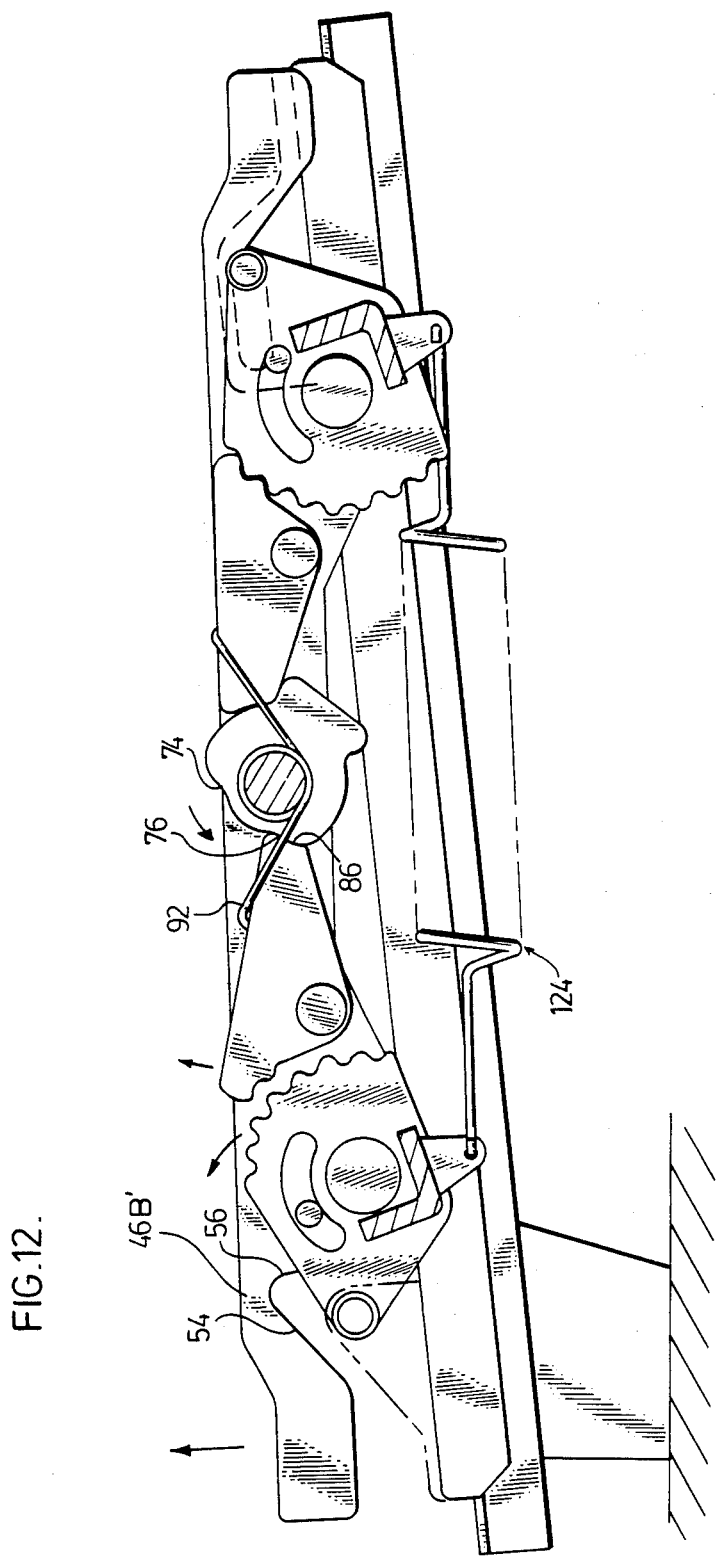

Seat assembly 26 is carried on the two frame assemblies 28 on either side of and under seat cushion 22. Each frame assembly 28 including assembly 26 comprises a generally L-shaped elongated sheet metal member 46 (see FIGS. 4, 5 and 9) comprising a top flange 47 and down turned wall 49 made up of end portions 46A and 46B at either end, vertically thinner portion $46A^1$ and $46B^1$ beside portions 46A and 46B, broader portions $46A^{11}$ and $46B^{11}$ beside portions $46A^1$ and $46B^1$ respectively and central portion 48 of about the same width as portions 46A and 46B. Directly below reduced portion $46A^1$ and $46B^1$ and defined on either side by sloping walls 50 and 52 of portions 46A and $46A^1$ respectively and sloping walls 54 and 56 of portions 46B and $46B^1$ respectively (see FIGS. 9, 11 and 12) are recesses 58 and 60 respectively. Central portion 48 carries an aperture 62 therethrough (see FIG. 8) for receiving one end of rod 64 and permitting rotation of rod 64 relative to member 46 in each aperture 62. Proximate each end of rod 64 extending through aperture 62, rod 64 supports a cam 66 on the side of wall 49 facing the other wall 49 and having a center 68 (see FIG. 9) on the longitudinal axis 69 of rod 64. Cam 66 rotates with rod 64. With reference to FIG. 9, each cam carries on its outer peripheral surface, opposed circular portions 70 and 72 on either side of center 68 and other portions 74 and 76 above circular portions 70 and 72. Each of portions 74 and 76 is closer through its entire length to the centre 68 and thus axis 69 than circular portions 70 and 72. Pawls 78 and 80 are pivotally secured to wall 49 by pins 82 and 84 respectively secured to wall 49 of member 46. Each pawl 78 and 80 carries a recess 86 on one end of each pawl 78 and 80 in the form of a cam follower corresponding in shape to the circular portions 70 and 72 of cam 66. Torsion spring 88 is wound around rod 64 proximate each cam 66 and has its two arms 90 and 92 overlying each of pawls 78 and 80, respectively proximate recesses 86 for urging each pawl downwardly. When each cam 66 is in the position shown in FIG. 9, each pawl cannot be rotated by arms 90 and 92. However, when cam 66 is in either of the positions shown in FIG. 11 or 12 where only one of the circular portions 70 or 72 remains engaged with one of the pawls 78 or 80 at a time, the other pawl is free to rotate by the action of spring arm 90 (see FIG. 11) or 92 (see FIG. 12).

On the other end of each of pawls 78 and 80 are teeth 94 spaced by notches 96 for engagement with notches 98 (by teeth 94) and teeth 100 (in notches 96) in ratchets 102 and 104 pivotally secured to wall 49 of member 46 by pins 106 and 108 respectively secured to wall 49. Ratchets 102 and 104 carry slots 110 and 112 (which form portions of an annulus) for receiving pins 114 and 116 respectively fixed to wall 49 for limiting the rotation of ratchets 102 and 103. On the end of each ratchet 102 and 104 remote the teeth 100 and notches 98, each ratchet 102 and 104 is secured to either pin 118 and 120 as the case may be to be pivotally secured thereto. Pin 118 and 120 do not pass through an opening in member 46 but rather lie below portion $46A^1$ and generally in the space between surfaces 50 and 52 (see FIG. 11) or portion $46B^1$ and generally in the space between surfaces 54 and 56 (see FIG. 12) respectively at all times.

Ratchets 104 and 106 each carry L-shaped member 122 joined to the opposite ratchet 104 and 106 on the opposite frame assembly 28. L-shaped members 122 connecting ratchets 104 and ratchets 106 on both frame assemblies 28 are secured together by a pair of normally stretched springs 124 (see FIGS. 4, 5, 8 and 9) to cause the L-shaped members to rotate towards the other L-shaped member when one of the ratchets 102 and 104 is released from engagement with one of pawls 78 and 80 respectively which has been permitted to rotate releasing one of ratchets 102 or 104 by one of arms 90 or 92.

Pins 118 and 120 are in turn after passing through ratchets 102 and 104 respectively on opposing frame assemblies 28, secured to supports 130 and 132 carried on each base 30. Support 132 comprises a pair of walls 132A and 132B carrying aligned holes 134 for securing pin 120 to base 30. Support 130 comprises a pair of walls 130A and 130B carrying aligned elongated slots 13 for securing rod 118 to base 30.

With reference to FIGS. 4, 5, 7 and 8, one elongated member 46 has been modified to provide elongated slot 140 through top flange 47. Rod 64 passing through aperture 62 carries pin 142 securing arm 144 rotatable on pin 142. Therefore, as arm 144 rotates, pin 142 and thus rod 64 carrying cams 66 are rotated. Arm 144 carries on the end thereof remote pin 142, pin 146 for securing in elongated slot 148 in arm 150 so that as arm 150 is rotated clockwise, arm 144 is rotated counterclockwise and vice versa. Arm 150 is secured by pin 152 (see FIG. 8) passing through wall 49 and arm 150 to sleeve 154 secured over pin 152. Sleeve 154 comprises two sections 154A (top section) and 154B (bottom section) spaced from each other carrying laterally extending flanges 156 and 158, flange 156 connected to top section 154A and flange 158 connected to bottom section 154B. Torsion spring 160 is wound around sleeve 154 and has its ends 160A and 160B positioned above and below projection 162 carried by top flange 47 to extend between ends 160A and 160B so that when sleeve 154 is forced to rotate clockwise or counterclockwise against the action of spring 160, spring 160 is wound so that when sleeve 154 is free to rotate, it is returned to its initial position shown in FIGS. 4, 5, and 8. Lever 164 is secured to sleeve 154 and comprises elongated tubular member 166 covered by cap 168 at one end and flattened at the other end at 170 to be carried between flanges 156 and 158 to be secured thereto by pin 172 (see FIG. 7) passing through apertures 156A in flange 156, 170A in flattened portion 170 and 158A in flange 158. When lever 164 is lifted by pulling upwardly on tubular portion 166 proximate cap 168, arms 156 and 158 are lifted (see FIG. 2) rotating sleeve 154 (against the action of spring 60) and arm 150 counterclockwise and thus arm 144 clockwise. When lever 164 is released it falls to its normal position shown in FIG. 1 by the action of arm 160B of spring 160 on flange 162. Similarily when lever 164 is depressed by pushing down on tubular portion 166 proximate cap 168, arms 156 and 158 are depressed (see FIG. 3) rotating sleeve 154 (against the action of spring 160) and arm 150 and thus arm 144 counterclockwise. When lever 164 is released it is raised to its normal position shown in FIG. 1 by the action of arm 160A of spring 160 on flange 162.

Arm 166 is secured with flattened portion 170 extending between arms 156 and 158 between sections 154A and 154B extending through slot 174 (see FIG. 7) welded to upstanding plate 176 oriented to extend at 90 degrees to the plane of flattened portion 170. Lever 161 is pivotable on pin 172 laterally away from and towards frame assembly 28 between arms 156 and 158. Plate 176 is positioned between arm 38 and base 30 to engage edge 38A of arm 38. Therefore, as lever 164 is pushed inwardly, plate 176 is pivoted outwardly engaging edge 38A of arm 38 causing latch 40 to pivot on pin 42 stretching spring 44A and removing tooth 36 from notch 44, permitting base (and thus seat 20) to move freely on track (rail) 32 to another position.

Thereafter, lever 164 is released causing latch 40 to pivot by the restoration of spring 44A to its normal unstretched condition moving tooth 36 into another notch 44. To prevent base and rail 32 from separating, a rolling spring 180 (see FIG. 10) is carried in a carriage 182 to roll in the space between track or rail 32 and base 30 and stopped by bumps (one of which is shown at 184) suitably placed on the interior surfaces of rail 32 and base 32 to stop spring 180 preventing the base from sliding further along track 32.

To raise the seat cushion 22 relative to base 30 and raise or lower the front of the seat cushion 22 relative to the rear or raise or lower the rear of the seat cushion 22 relative to the front, lever 164 is picked up or lowered as the case may be. To raise the height of the front seat cushion 22, lever 164 is lifted and held (see FIG. 2) rotating arm 150 clockwise and thus arm 144 clockwise rotating rod 64 and each cam 66 clockwise causing each cam to move circular portion 70 away from recess 86 and move portion 74 into recess 86 permitting the end of pawl 78 proximate recess 86 to pivot downwardly by arm 91 of spring 88 to release teeth 94 from notches 98 and teeth 100 from notches 96 as pawl 78 is pivoted on pin 82. Because recess 86 of pawl 80 remains engaged with circular portion 72, pawl 80 is not released. As pawl 78 pivots, ratchet 102 is free to rotate about pin 106 and rod 118 by the action of spring 124. When this happens if the person sitting on the seat is leaning back in the seat (with the person's weight towards the rear of the seat) the front of member 46 (because it is secured to ratchet 102) rises (see FIGS. 11 and 14). Springs (not shown) exert an upward force on seat cushion constantly urging it upwardly to counter the user's weight who is adjusting the seat. When the front of the seat is permitted to rise to the desired height, the user releases the lever returning the cam 66 to its original position locking recess 86 to circular portion 70 locking the teeth 94, 100 and notches 96, 98 of the pawl 78 and ratchet 102 together fixing the height of the front of the seat.

If the front seat is to be lowered, after lever 64 is raised the user merely sits on the front part of the seat, causing the front of the seat to be pushed down to the desired height. Lever 164 is then released. Rotation of ratchet 102 is limited by pin 114 riding in slot 110. As is apparent a portion of the surface of each cam 66 and a portion of cam follower surface of recess 86 are always engaged to ensure the integrity of the structure is maintained. As is also apparent, the adjustment to the seat is weight-operated by moving the weight of the user to different parts of the seat and only either the front of rear of the cushion is adjustable at one time. Where the leading end 46A of elongated member 46 rises (as ratchet 102 pivots upwardly) elongated slot 136 accommodates the movement of pin 118.

Where the rear of the seat cushion is to be raised the user of the seat moves his/her weight toward the front of the seat taking most of his/her weight off the rear part of the seat. Lever 164 is then depressed and held (see FIG. 3) rotating cam 66 counterclockwise thus moving portion 76 of cam 66 to engage recess 86 (see FIG. 12) permitting pawl 80 to be depressed by arm 92 proximate recess 86 and be rotated around pin 84 releasing ratchet 104 to pivot about pin 108 and 120 under the action of spring 124 raising the end of ratchet 104 carrying teeth 100 and notches 98 thus lifting end 46B supporting seat cushion 22 as shown in FIG. 3, raising cushion 22. Lever 164 is then released. To lower the rear of cushion 22, the person sits with his/her weight toward the rear of cushion 22 as lever 164 is depressed pushing the seat down against the action of the springs 124 compressing springs 124.

As previously described for longitudinal adjustment of seat 20 relative to tracks 32, lever 164 is pivoted on pin 172 towards the one frame assembly 28 to which it is nearest causing plate 176 to engage edge 38A of arm 38 and rotate latch 40 about pin 42 stretching spring 44A removing tooth 36 from notch 44. Thereafter, bases 30 on both sides of seat 20 are able to slide on track (rails) 32 to a new position. The user thereupon releases lever 164 thereby permitting spring 44A to pull tooth 36 into a new notch 44 in (track) rail 32 causing the rotation of latch 40 counterclockwise and thus arm 38 about pin 42 pushing plate inwardly, rotating lever 164 outwardly around pin 172 to its normal position (see FIG. 5).

As is apparent, adjustment of the seat position and height is relatively simple. For longitudinal adjustment, lever 164 is pushed inwardly and held and the driver slides the seat on track (rail) 32 until the desired position is reached. Thereafter, lever 164 is released locking the seat in position. As is apparent, lever 164 is held inwardly until the adjustment is completed. For adjusting the height and inclination of cushion 22, lever 164 is either depressed or lifted and the person's weight shifted to cause the front or rear of the cushion to be depressed or be raised under spring action as the case may be.

The seat assembly is of a lower profile (being about 62 mm in height) enhancing its stability. Additionally, because of the type of relative movement of the various components, noise is minimized during operation.

With reference to FIG. 13 cam arrangement 200 is provided which may be substituted for cam 66, rod 64 and torsion spring 88 shown in FIG. 9.

Cam arrangement 200 comprises cam section $266^1$ and $266^{11}$ pivoted to rotate on pin $268^1$ and $268^{11}$ respectively secured to portion 48 of assembly 46. Cam sections $266^1$ carries circular portion 270 and cam $266^{11}$ carries circular portion 272 opposite circular portion 270. Portions 274 and 276 are positioned above circular portions 270 and 272 respectively. Flanges 202 and 204 are connected to each cam $266^1$ and $266^{11}$ respectively and are connected by spring 206 connected by ends $206^1$ and $206^{11}$ to flanges 202 and 204 respectively.

Disposed between cam sections $266^1$ and $266^{11}$ is lever 208 pivotally secured at its bottom 208b by pin 210 to portion 48 of member 46 and carrying handle 212. Pivoted on pin 210 behind lever 208 are drive members $214^1$ and $214^{11}$ carrying a contact surface $216^1$ and $216^{11}$ in the same plane as lever 208. Drive members $214^1$ and $214^{11}$ carry pins $218^1$ and $218^{11}$ respectively secured to members $214^1$ and $214^{11}$ respectively for engaging side edges $267^1$ and $267^{11}$ respectively on one side of drive member $214^1$ and $213^{11}$ respectively and for being secured to extend into arcuate slots $220^1$ and $220^{11}$ respectively through portion 48 of member 46 which arcuate slots $220^1$ and $220^{11}$ define the extent of movement of pins $218^1$ and $218^{11}$. Pawl 78 engages curved portion 270 of cam section $266^1$. Pawl 80 engages curved portion 272 of cam section $266^{11}$.

In the operation of arrangement 200, when lever 208 is pushed to one side or the other, either pin $218^{11}$ or pin $218^1$ is pushed to one side to engage one surface $267^1$ or $267^{11}$ respectively in its slot $220^1$ or $220^{11}$ thereby rotating either cam section $266^1$ or $266^{11}$ causing either pawl 78 or 80 to rotate stretching spring 206 in the manner previously described. When lever 208 is released, spring 206 restores causing the rotated cam section to pivot on its pivot to its initial position causing the released pawl to be restored postion. Thereafter the lever is pushed to the other side for adjustment purposes.

With reference to FIGS. 14, 15 and 16, cam arrangement 300 is disclosed for substitution with cam 66 in FIG. 9 for securing to rod $68^1$ around which rod $68^1$ is secured torsion spring $88^1$ and extending over pawls 78 and 80 shown in FIG. 9. Cam arrangement 300 comprises cam 366 carrying opposed circular portions 370 and 372 on either side of rod $68^1$ and other portions 374 and 376 below circular portions 370 and 372 respectively. Each of portions 370 and 372 is closer through its entire length to the center $68^1$ and thus axis $69^1$ than circular portions 370 and 372.

Cam 366 also carries spaced teeth 302 (spaced by recesses 303) on the bottom circular periphery between portions 374 and 376. Teeth 302 and recesses 303 are adopted to mesh with teeth $304^1$ and $304^{11}$ and recesses $305^1$ and $305^{11}$ carried on the ends of elbows $306^1$ and $306^{11}$ respectively. Elbows $306^1$ and $306^{11}$ are pivoted on pins $308^1$ and $308^{11}$ respectively, secured to member 46. At the other end of each of elbows $306^1$ and $306^{11}$ are arms $310^1$ and $310^{11}$ respectively. The distance between pivot pin $308^1$ to the end of arm $310^1$ is equal to the distance between pivot pin $308^1$ to the outer extent of teeth $304^1$ which are spread circularly on the end of elbow $306^1$. The distance between pivot pin $308^1$ to the end of arm $310^{11}$ is equal to the distance between pivot pin $308^{11}$ to the outer extent of teeth $304^{11}$ which teeth are spread circularly on the end of elbow $306^{11}$. Arms $310^1$ and $310^{11}$ normally engage the arcuately curved undersurfaces $378^1$ and $380^1$ of pawls 78 and 80 respectively when cam 366 in the position shown in FIG. 14. To release one of pawls 78 and 80 for seat adjustment purposes previously described from the position shown in FIGS. 14 and 15, cam 366 is rotated on rod $68^1$ bringing either the end of pawl 78 into the recess 374 or the end of pawl 80 into recess 376 respectively, permitting releasing of the ratchet to which the pawl is secured (as previously discussed), either the front or rear end of the seat cushion may be adjusted. With reference to FIG. 16, cam 366 has been rotated clockwise about pivot pin $68^1$ rotating elbow $306^1$ counterclockwise about pivot pin $308^1$ until the position shown in FIG. 16 and arm $306^1$ counterclockwise to the position shown. At the same time pawl 80 has entered recess 376 by the action of torsion spring 88, raising the other end of the pawl from the associated ratchet permitting the seat cushion above the released ratchet to be adjusted. The engaging of the other pawl 78 engages portion 369 which acts as a stop. When cam 366 is to be returned to its initial position the released and depressed pivot pawl must be elevated out of the recess into which spring 88 has forced it. In this regard, as cam is rotated counterclockwise both elbows $306^1$ and $306^{11}$ are rotated clockwise causing arm $310^1$ to follow the undersurface $378^1$ of pawl 78 and arm $310^{11}$ to rotate against the undersurface $380^1$ of pawl 80 forcing the pawl to pivot upwardly about its pivot $84^1$ forcing the spring arm of spring 88 to rise, returning the arrangement to the position shown in FIGS. 14 and 15.

Figure 17:
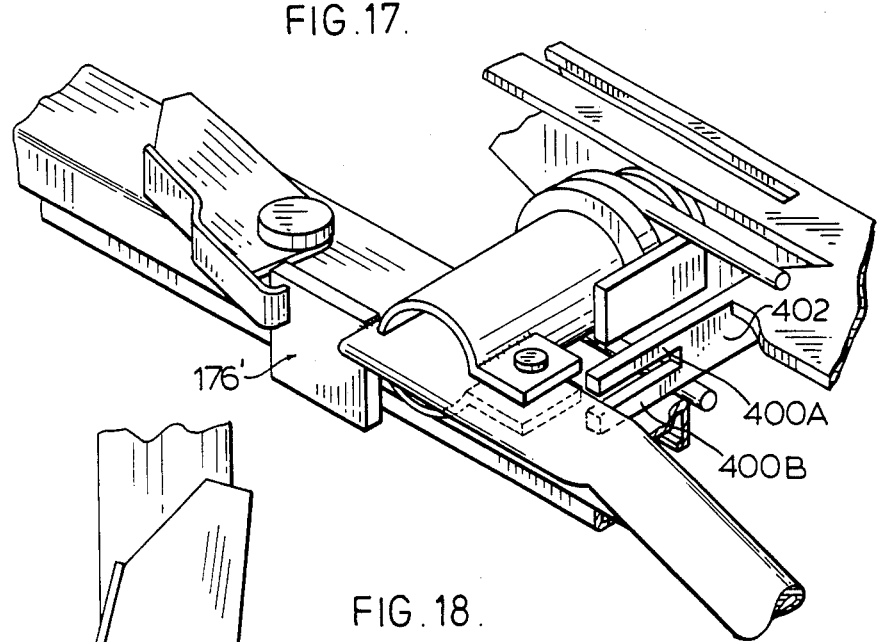
FIGS. 17, 18 and 19 are perspective, top and side views respectively of part of another assembly according to another embodiment of the invention.
Figure 18:
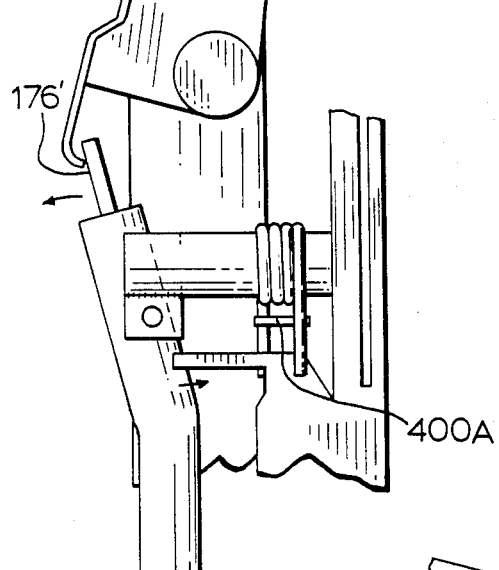
Figure 19:
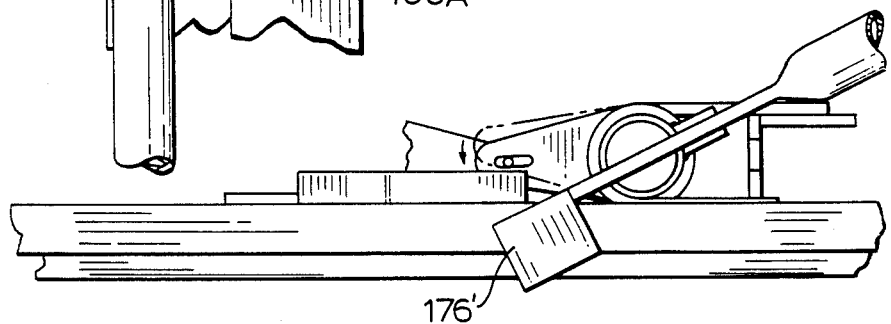

With reference to FIGS. 17, 18 and 19, parts of another embodiment of the invention are shown which permits only one adjustment to be made at a time (either seat cushion inclination or longitudinal position). Unlike the assembly shown in FIGS. 5, 7 and 8, the rotation of lever 164 laterally on pin 172 cause arm 38 to pivot latch 40 by the engagement of arm 38 with plate 176, also causes lever 164 to be caught between tines 400A and 400B of fork 402, fixed to elongated member 46 thereby precluding vertical movement of lever 164 when the longitudinal position of the seat it to be changed. (see FIG. 18). When lever 164 is returned to its original position locking the seat into its new longitudinal position, the vertical adjustment of the seat may be accomplished by raising and lowering of lever 164 rotating cam 66. When lever 164 is lowered or raised because of the size of plate 176$^1$ (which is smaller than plate 176), plate 176 is taken out of engagement with arm 38 so that when lever 164 is raised or lowered, arm 38 cannot engage plate 176$^1$. (See FIG. 19)

Figure 20:
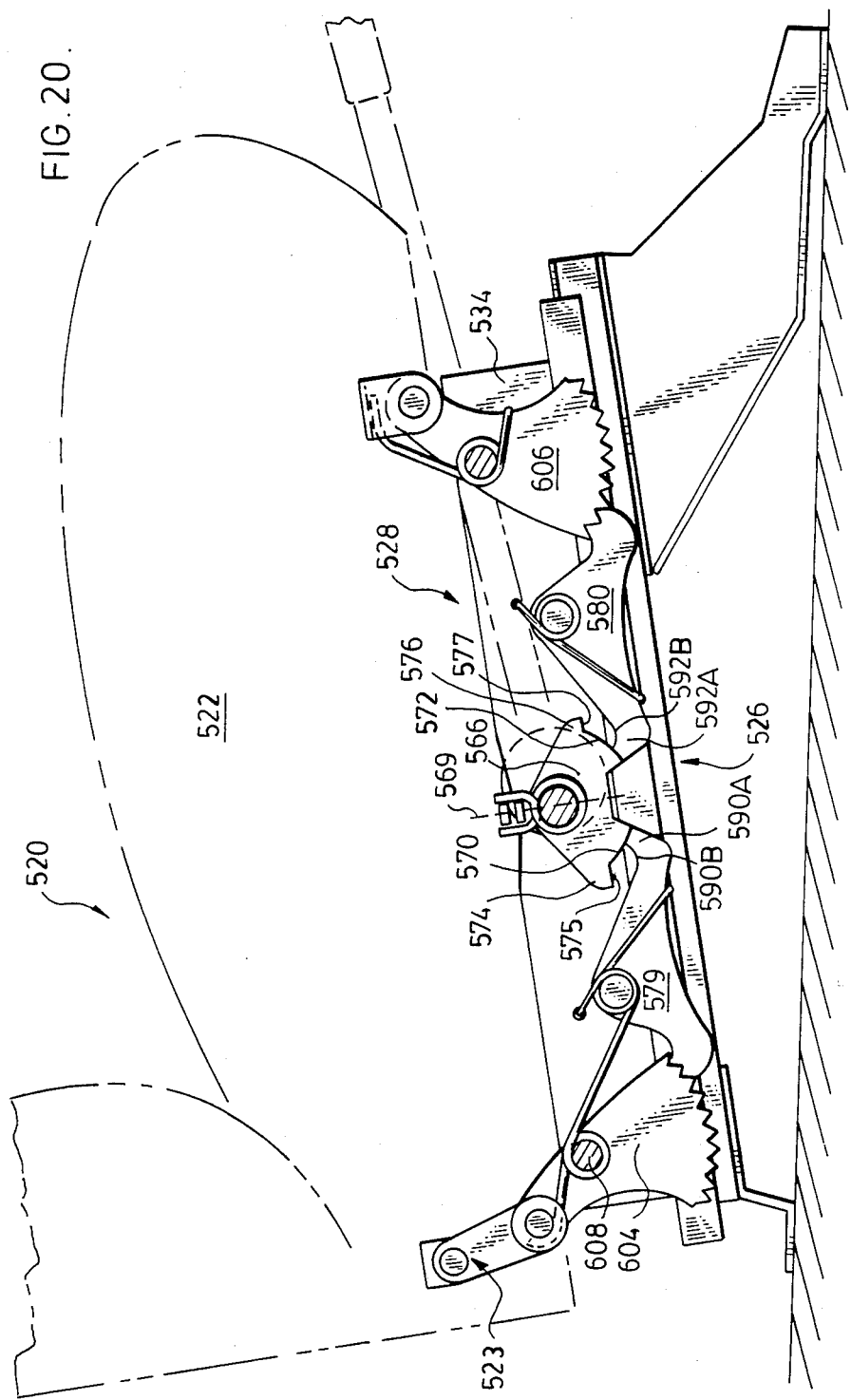
FIG. 20 is a side view of part of another seat adjustment assembly which may be used for adjusting a seat.
Figure 23:
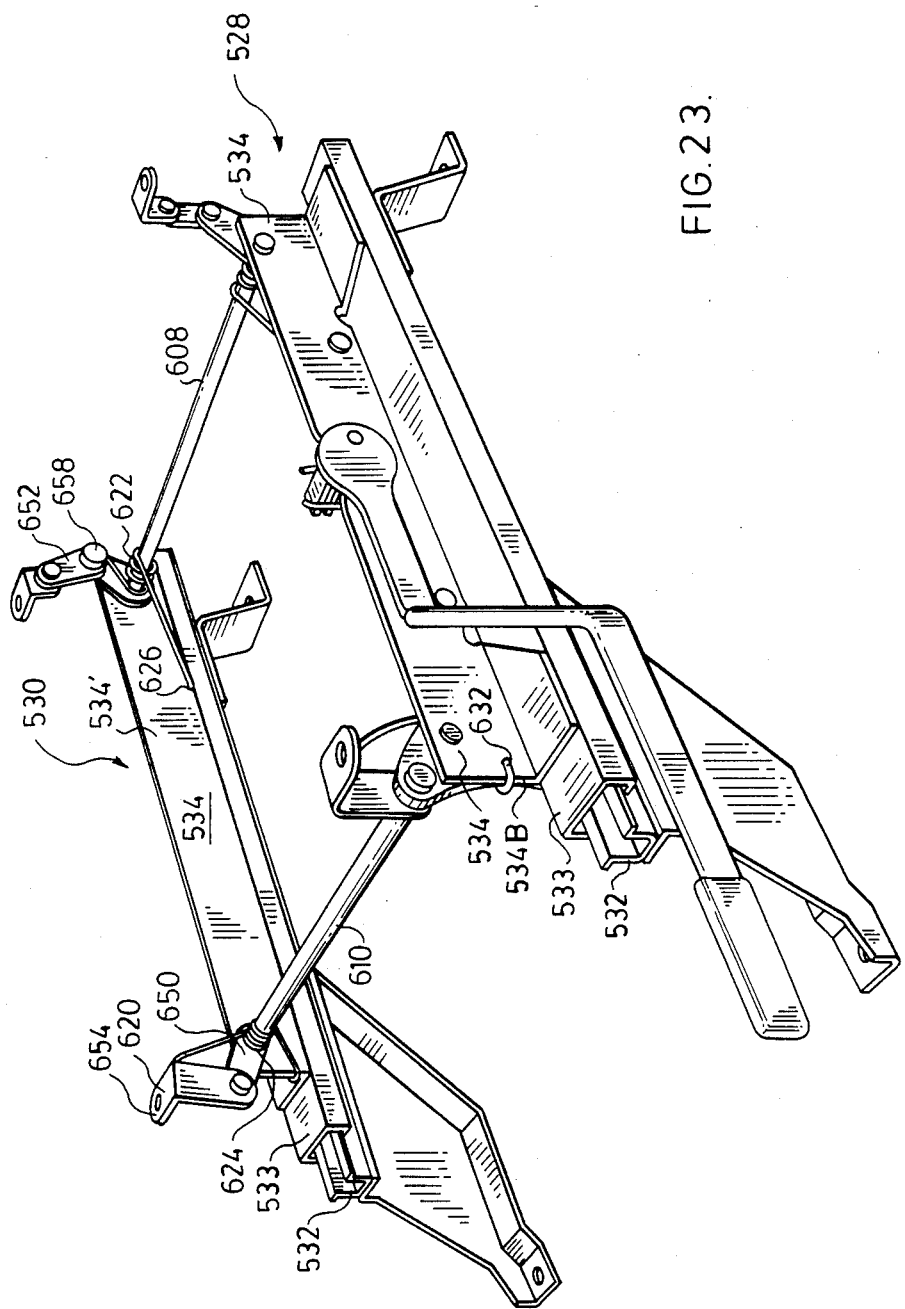
FIG. 23 is a perspective view of part of the seat adjustment assembly of FIG. 20, 21 and 22 looking from another direction.
Figure 24:
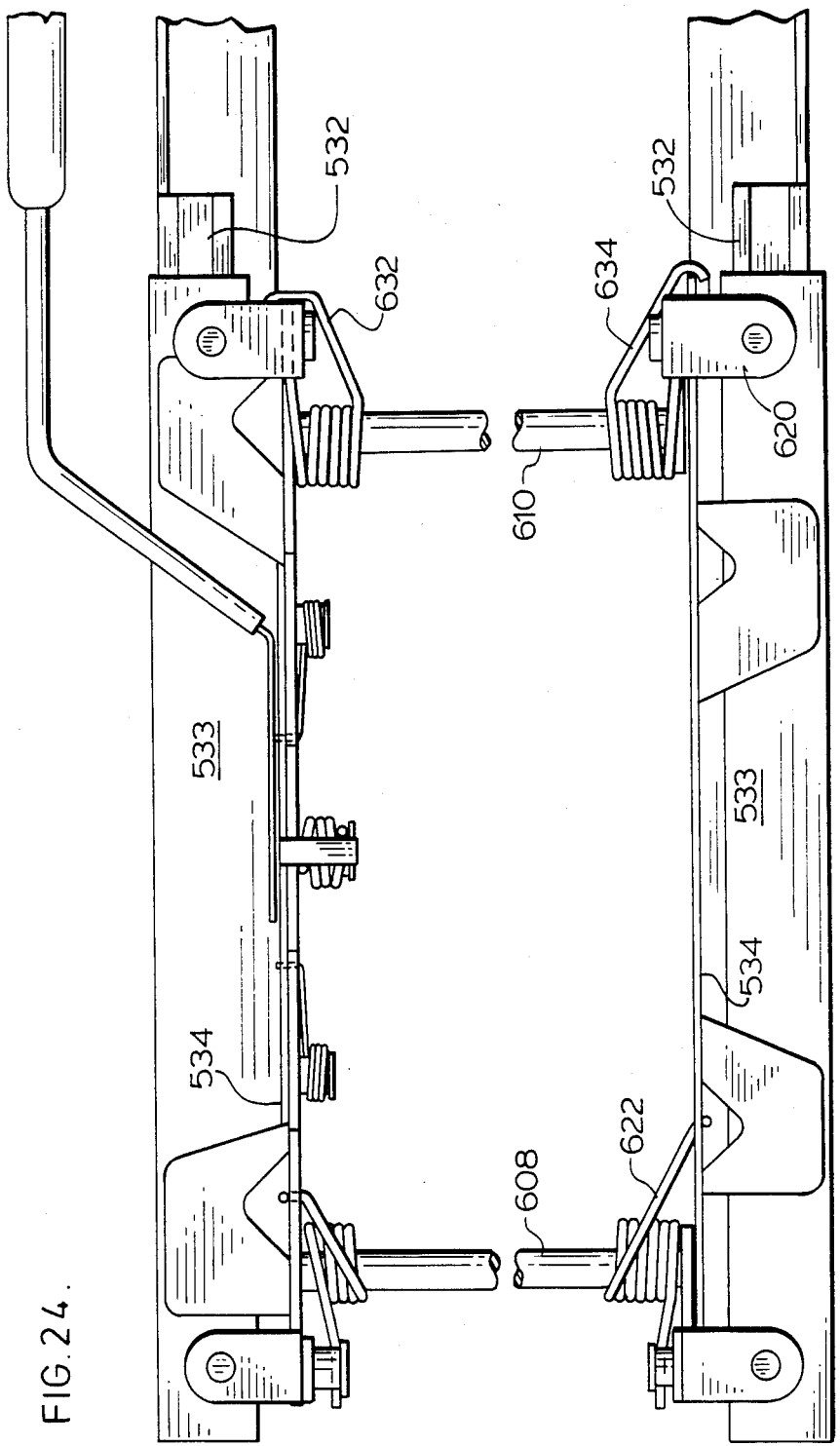
FIG. 24 is a top plan view of the seat adjustment assembly shown in FIGS. 20 to 23 inclusive.

With reference to FIGS. 20 and 24 inclusive, there is shown seat generally shown as 520 having seat cushion 522 and seat back 524 pivotally secured at 523 to pivot with respect to seat cushion 522. Seat cushion is secured to seat adjustment assembly generally shown at 526. With reference to FIG. 23 and 524 seat adjustment assembly 526 is carried on frame assembly 528 on one side of seat cushion 522 to which seat cushion 522 is secured and is secured to another assembly 530 (see FIG. 23) on the other side of seat cushion 522 to which seat cushion 522 is also secured. Each assembly 528 and 530 is secured to one of the spaced stationary tracks 523 for sliding movement there along when released for movement by the release of for example, a tooth secured in a notch in track 532 (not shown).

With reference to FIG. 23, a runner 533 is secured to ride on each track 532. Each runner carries L-shaped support members 534 and 534$^1$ which frame assembled 528 and 530 are secured respectively.

Figure 21:
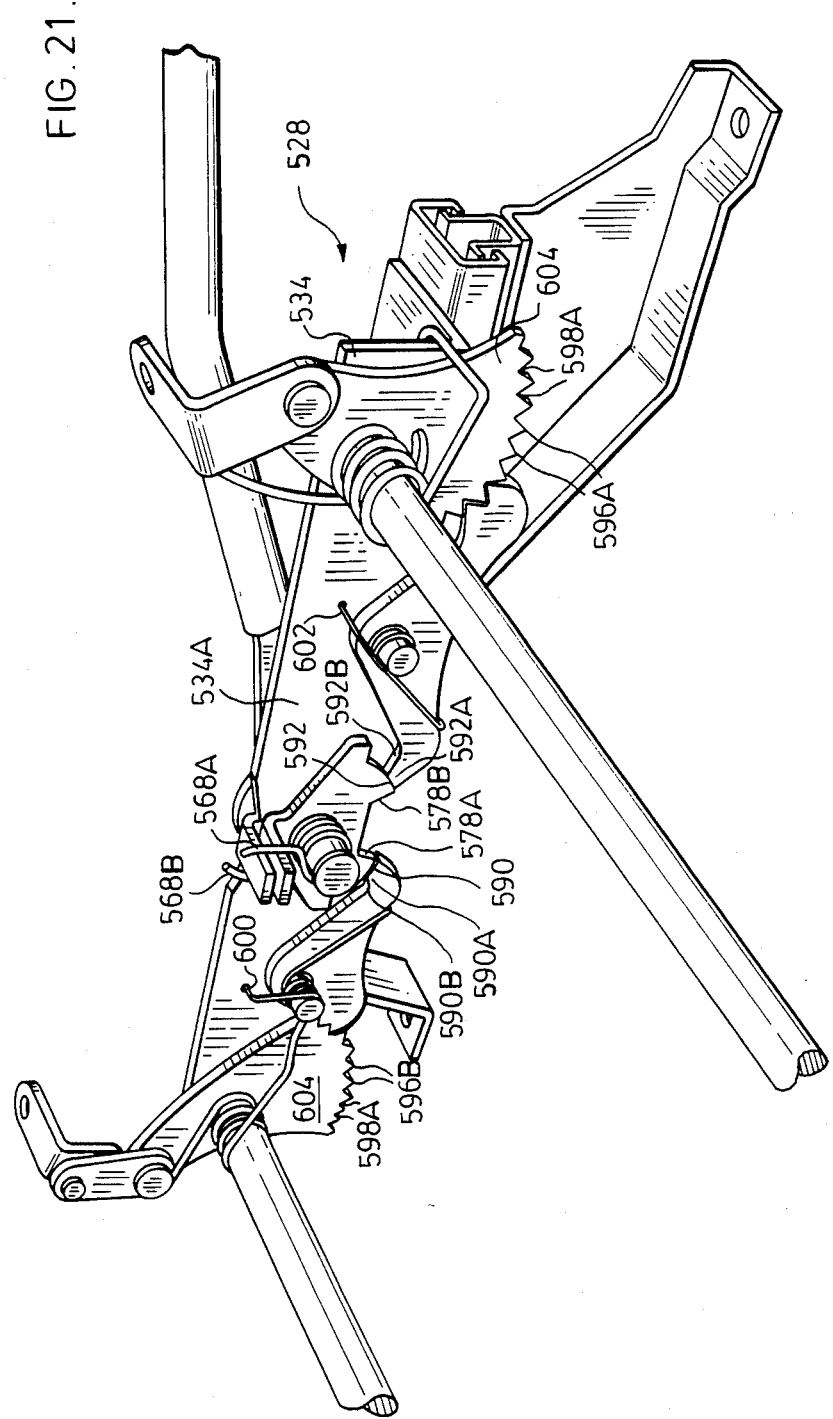
FIG. 21 is a perspective view of the seat adjustment assembly shown in FIG. 20.
Figure 22:
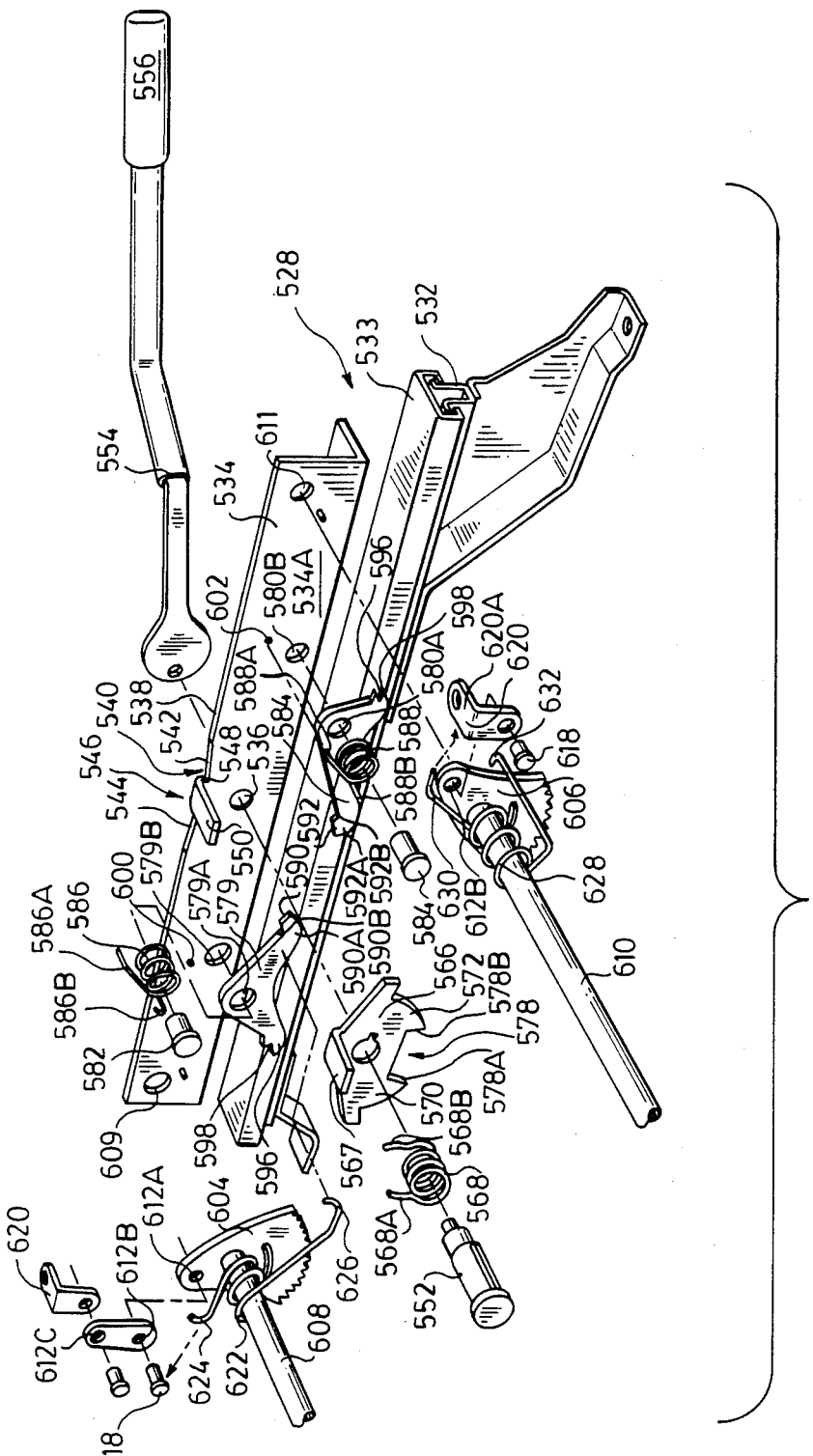
FIG. 22 is an exploded view of part of the structure shown in FIGS. 20 and 21.

With reference to FIGS. 21 and 22, L-shaped support 534 carries proximate the center round aperture 536 spaced from top edge 538. Above aperture 536 top edge carries recess 540 comprising sloped side walls 542 and 544, sloped towards central area 546 from which upwardly extending connected tab 548 extends. Tab 550 extends laterally outwardly from the upper end of connector tab 548 away from L-shaped support 534. Stopped pin 552 passes through aperture 536 and is secured to lever arm 554 on one side of upright flange 534A to pivot with lever arm 554 as arm 554 is raised or lowered when handle 556 is grasped and either pulled up or pushed down. Pin 552 carries on the other side of flange 534A cam 566 to which it is secured and locked to rotate therewith and torsion spring 568 carrying upstanding arms 568A and 568B from the ends of spring 568. Cam 556 carries outwardly directed tab 567 which is positioned directly below tab 550. Cam 556 has an axis of symmetry 569 (see FIG. 20) and carries circular portions 570 and 572 on either side of axis of symmetry 569. Wings 574 and 576 extend laterally from cam 566 and carry stop surfaces 575 and 577 respectively. Between circular portions 570 and 572 is recess 578 defined on either end by sloped walls 578A and 578B sloping towards the center of recess 578 from circular portions 570 and 572. Arms 568A and 568B of spring 568 are positioned on other side of overlying tabs 550 and 561 (see FIG. 21) Pawls 579 and 580 are pivotally secured to support 534 by pins 582 and 584 passing through apertures 579A and 579B and 580 and 580B in pawls 579 and 580 and right flange 534A. Each of pins 582 and 584 carries a torsion spring 586 and 588 respectively having arms 586A and 586B and 588A and 588B at the ends thereof.

Pawls 579 and 580 carry cam follower surfaces 590 and 592 (curved to follow surfaces 570 and 572 of cam 566) on L-shaped ends 590A and 592A carrying inner surfaces 590B and 592B. The other end of each of pawls 590 and 592 carry two teeth 596 spaced by notch 598. Arm 586A of spring 586 is secured to extend through aperture 600 in upright flange 534A (see FIG. 21) and arm 586B wraps around pin 582$^1$. Arm 588A of spring 588 is secured to extend through aperture 602 in upright flange 534A and arm 588B wraps under pawl 580.

Teeth 596 and notch 598 of each pawl are secured in a complementary configuration of notches 598A and teeth 596A in ratchets 604 and 606. Each of ratchets 604 and 606 are pivotally secured to upright flange 534A, ratchet 604 by rod 608 passing through aperture 609 upright flange 534A and being secured on other side and ratchet 606 by rod 610 passing through aperture 611 (see FIG. 22) of upright flange 534A and being secured on the other side. Ratchet 604 carries an aperture 612A through its end opposite the teeth 596A and notches 598A through which aperture plate 614 is pivotally secured through aperture 612B ratchet 604 by pin 618 passing therethrough. Plate 614 also carries aperture 612C through which pin 620 passes pivotally securing L-shaped member 620 to plate 614. A similar L-shaped cushion support 620 is also pivotally secured by a pin 618 to ratchet 606.

Rod 608 carries torsion spring 622 and 624 of which wraps around pin 618 (see FIG. 22) and the other end 626 of which wraps under pawl 579. Rod 610 also carries a torsion spring 628, one end 630 sits under the upper laterally extending flange 620A of flange 620 and the other end 632 wraps around the end 534B of upright flange 534A.

Rods 608 and 610 are pivotally connected at their other ends through plates 650 to L-shaped support 534$^1$. Plate 650 pivotally secured to rod 608 is pivotally secured to another plate 652 by pin 658 in turn pivotally secured to an L-shaped cushion support 620. Plate 650 pivotally secured to rod 610 is pivotally secured directly to an L-shaped cushion support 620. Rods 608 and 610 carry torsion springs 622 and 628 respectively. Spring 622 has one end secured through an aperture in the upright flange of support 534$^1$ and the other end secured about pin 658 pivotally securing plate 650 to plate 652. Spring 624 has one end carried under flange 654 at support 620 and the other end wrapped around end 534$^{11}$ of support 534$^{11}$.

With reference to FIG. 20, each of supports 620 is secured to underside of the seat cushion 522. Because each support 620 is pivotally secured to its associated plate, it is apparent this structure may be secured to support many different size cushions.

With reference to FIGS. 25 to 28 inclusive, the operation of seat adjustment assembly 526. When lever 554 is depressed (pushed down) cam 566 is rotated clockwise causing both pawls 579 and 580 to ride on the circular surfaces 570 and 572 respectively until portion 590A of pawl 579 is forced by torsion spring 622 into recess 578 causing surface 590B to engages surfaces 578A. While portion 590A continues to ride on portion 572 until it engages stop surface 577 of using 576. As portion 590A enters recess 578 it is caused to continue to pivot counterclockwise against surface 578A. The angles of surfaces 578A and 590B are such so that only "point contact" (as opposed to line contact) exists between the two portions to ensure the two surfaces are not locked together so that when cam 566 rotates counterclockwise surface 578A forces surface 590B (and thus pawl 579) to pivot counterclockwise pushing portion 590A out of recess 578 to cause surface 590 to re-engage circular portion 570.

When pawl 579 pivots counterclockwise, teeth 596 are removed from notches 598A permitting ratchets to rotate counterclockwise with rod 608, permitting seat cushion 622 to rise at the rear end of the seat. Because the rear seat cushion portion proximate rod 608 is free to rise, it can be depressed under extra force (as by the passenger leaving back and concentrating his/her weight over rod 608, depressing the cushion, the desired height of the cushion can be set. At the same time, because pawl 580 engages curved surface 572, the height of the front of cushion 522 cannot be adjusted. (see FIG. 27).

By reversing the rotation of the cam (counterclockwise) by lifting arm 554 by handle 556 (see FIG. 28) the front of the cushion can be adjusted.

As many changes can be made to the embodiments without departing from the scope of the invention, it is intended that all matter contained be interpreted as illustrative of the invention and not in a limiting sense.

The embodiments of the invention in which an exclusive property or privilege is claimed are as follows:

1. A lever assembly for manual six-way seat adjustment of the position of a seat having a seat cushion carried on a track secured to a seat base which permits only one adjustment to be made at one time, either seat cushion inclination or longitudinal positioning of the seat along a track from one position to another,
   (a) forward and backwards along a track from one position to another position;
   (b) raising or lowering the front of the seat relative to the rear of the seat, and
   (c) raising or lowering the rear of the seat relative to the front of the seat, the lever assembly comprising a lever, the lever being pivotally secured in a holder carried by the seat base to pivot towards the seat to thereby cause the removal of removebly securable securing means normally carried by the base securing the base of the seat to the track to be removed releasing the base of the seat permitting slidable movement of the base of the seat on the track and permitting the base of the seat to be secured at said another position along the track when the lever is released urging the securing means to secure the base of the seat to the track, the lever also being rotatable in a vertical direction without releasing the base of the seat for movement in the track either clockwise or counterclockwise to permit activation of a system for permitting vertical adjustment of the seat cushion, the lever assembly operating with a seat adjustment assembly for adjusting the inclination and vertical position of a seat cushion of a seat, the seat adjustment assembly comprising a pair of pawls normally releasably fixed against pivoting by their engagement with an assembly disposed between them and which pawls when released one at a time, permit adjustment of the inclination and vertical position of the seat cushion, the assembly between the pawls comprising a cam assembly carrying opposed peripheral circular portions and another portion adjacent each circular portion facing each other and being closer to one another than the circular portions are close to one another and the ends of the pawls engaging the assembly, and each pawl carrying a recess corresponding in shape to the circular cam portion to which they are engaged and whereby means are provided for displacing the cam assembly and thus the pawls to permit adjustment and means for returning the cam assembly and pawls to their normal position.

2. The lever assembly of claim 1, wherein the lever is pivotally secured in the holder to pivot towards the seat.

* * * * *